US011748509B2

(12) United States Patent
Gardner et al.

(10) Patent No.: US 11,748,509 B2
(45) Date of Patent: Sep. 5, 2023

(54) METHODS AND APPARATUS FOR AUTOMATICALLY CONTROLLING ACCESS TO STORED DATA, A STORAGE LOCATION OF STORED DATA, AND/OR OWNERSHIP OF STORED DATA BASED ON LIFE EVENT INFORMATION

(71) Applicant: Wrethink, Inc., Del Mar, CA (US)

(72) Inventors: James Gardner, Palm Springs, CA (US); Arlene Harris, Del Mar, CA (US)

(73) Assignee: Wrethink, Inc., Del Mar, CA (US)

( * ) Notice: Subject to any disclaimer, the term of this patent is extended or adjusted under 35 U.S.C. 154(b) by 353 days.

(21) Appl. No.: 16/799,795

(22) Filed: Feb. 24, 2020

(65) Prior Publication Data

US 2020/0272758 A1    Aug. 27, 2020

Related U.S. Application Data

(60) Provisional application No. 62/809,716, filed on Feb. 24, 2019.

(51) Int. Cl.
*H04L 9/32* (2006.01)
*G06F 21/62* (2013.01)
(Continued)

(52) U.S. Cl.
CPC ......... *G06F 21/6245* (2013.01); *G06Q 10/10* (2013.01); *G06Q 30/0185* (2013.01);
(Continued)

(58) Field of Classification Search
CPC ........................ G06F 21/6245; G06Q 10/10; G06Q 30/0185; G06Q 50/186; H04L 63/102
See application file for complete search history.

(56) References Cited

U.S. PATENT DOCUMENTS 5,809,493 A     9/1998 Ahamed et al.
7,653,592 B1 *  1/2010 Flaxman ................ G06Q 40/02
                                                    705/37

(Continued)

FOREIGN PATENT DOCUMENTS

CA     2850883 A1    11/2014
EP     3502979 A1     6/2019
WO  2018/014109 A1    1/2018

OTHER PUBLICATIONS

Notification of Transmittal of the International Search Report and The Written Opinion of the International Searching Authority or the Declaration, International Search Report and Written Opinion of the International Searching Authority from PCT/US 2020/020852, dated May 28, 2020 1-9 pages.

(Continued)

*Primary Examiner* — Yves Dalencourt
(74) *Attorney, Agent, or Firm* — Straub & Straub; Michael P. Straub; Stephen T. Straub

(57) ABSTRACT

A multi-purpose appliance for providing a wide variety of functions, e.g., home management, device management and synchronization, archiving and distributing electronic copies of photos and/or film images and/or other services such as video conferencing is described. In various embodiments data is stored in a digital vault. The owner of stored content can set access rules and/or grant access to other individuals in a group, e.g., a family group. Content can be and sometimes is organized into categories with each category corresponding to a different type of information, e.g., medical information, personal information, calendar information, legal records family photos, etc. An owner of content can specify their relationships to another individual, e.g., another family member and have access and ownership rules apply based on the relationship to the owner of the content and/or specific user specified rules. Content is automatically added (Continued)

to the digital store, e.g., in response to the content being scanned or entered electronically by the owner. In response to detecting a life event, e.g., based on information in a scanned document, ownership and/or access rights to content are automatically updated to reflect the effect of the detected life event. For example a marriage may result in an automatic change to joint ownership status and/or a death may result in a change of ownership while a child leaving a house and moving to an apartment may result in an automatic restriction from obtaining access to some household financial information while the child is still allowed to access family photos.

19 Claims, 15 Drawing Sheets

(51) Int. Cl.
*H04L 9/40* (2022.01)
*G06Q 30/018* (2023.01)
*G06Q 50/18* (2012.01)
*G06Q 10/10* (2023.01)

(52) U.S. Cl.
CPC ......... *G06Q 50/186* (2013.01); *H04L 63/102* (2013.01); *G06Q 2220/18* (2013.01)

(56) References Cited

U.S. PATENT DOCUMENTS

| | | | |
|---|---|---|---|
| 8,649,602 B2 | 2/2014 | Tang et al. | |
| 2002/0077986 A1* | 6/2002 | Kobata | H04L 63/10 |
| | | | 705/52 |
| 2007/0240203 A1* | 10/2007 | Beck | G16H 10/60 |
| | | | 726/4 |
| 2009/0083332 A1 | 3/2009 | Datta et al. | |
| 2014/0184843 A1 | 7/2014 | Campbell et al. | |
| 2014/0201126 A1 | 7/2014 | Zadeh et al. | |
| 2015/0220786 A1 | 8/2015 | Folkens et al. | |
| 2016/0072771 A1* | 3/2016 | Krietzman | G06Q 30/0277 |
| | | | 726/3 |
| 2017/0243125 A1 | 8/2017 | Thomas et al. | |
| 2018/0083771 A1* | 3/2018 | Bonnell | H04L 9/32 |
| 2019/0051398 A1 | 2/2019 | Zankowski et al. | |
| 2019/0228174 A1* | 7/2019 | Withrow | H04L 9/3278 |
| 2020/0042645 A1 | 2/2020 | Douthit et al. | |
| 2020/0050842 A1 | 2/2020 | Kim et al. | |
| 2020/0052882 A1* | 2/2020 | Tummalapenta | H04L 9/50 |
| 2020/0090012 A1 | 3/2020 | Darnell et al. | |
| 2021/0012164 A1 | 1/2021 | Qiao et al. | |

OTHER PUBLICATIONS

Guang Xu et al., Automatic land cover classification of geo-tagged field photos by deep learning, ELSEVIER, 2017, pp. 127-134 (Year: 2017).

Valentina Franzoni et al., Context-based Image Semantic Similarity, IEEE, 2015, pp. 1280-1284 (Year: 2015).

Yang Yang et al., Exploiting Web Images for Semantic Video Indexing Via Robust Sample-Specific Loss, IEEE, 2014, pp. 1677-1689 (Year: 2014).

Yasuharu Maeda et al., Fully automated diagnostic system with artificial intelligence using endocytoscopy to identify the presence of histologic inflammation associated with ulcerative colitis (with video), Gastrointestinal endoscopy, vol. 89, 2019, pp. 408-415 (Year: 2019).

\* cited by examiner

| FIGURE 11A |
| FIGURE 11B |
| FIGURE 11C |

METHODS AND APPARATUS FOR AUTOMATICALLY CONTROLLING ACCESS TO STORED DATA, A STORAGE LOCATION OF STORED DATA, AND/OR OWNERSHIP OF STORED DATA BASED ON LIFE EVENT INFORMATION

RELATED APPLICATIONS

The present application claims the benefit of the filing date of U.S. Provisional Patent Application Ser. No. 62/809,716 which was filed Feb. 24, 2019 and which is hereby expressly incorporated by reference in its entirety.

FIELD OF THE INVENTION

The invention relates to storage of data, controlling of access to stored data and/or rights management, e.g., based on live events, rules, ownership information and/or family or other relationships between individuals of a group such as a family.

BACKGROUND

Household members and heads of households in particular, are confronted what is sometimes a dizzying amount of paperwork to organize, schedules to manage, bills to pay, communications services to manage, etc. Often in households with multiple individuals, it is difficult to keep track of the schedule commitments of different household members. In many cases, with everyone on the run, it is even difficult to leave physical notes for one another in a location where individuals can be sure that the notes will be seen.

In addition to simple scheduling and communications issues, individuals are often confronted with the need to maintain personal records in a safe and reliable manner, e.g., medical records, tax records, bills, etc. In addition to financial information household members may have a need or reason to store more personal information such as photos and/or copies of important documents.

Household members may each use one or more communications devices, and the ability synchronize information stored in multiple different devices, often obtained from different companies, can be technically challenging for many individuals. While some individuals in a household may be technically savvy, it is often the case that one or more individuals in a household are not.

Accordingly, there are many needs household members confront on a regular basis. Management and organization of information, services, etc. relating to a household can be a difficult and time consuming task. Unfortunately many families do not have the time, tools or skills to maintain and manage a household in a well ordered and timely manner. A lot of time may be lost looking for receipts, calling service providers to arrange changes in service, searching for documents and records, etc.

There is a wide range of needs faced by a variety of individuals many of which relate to the documenting, storage and/or communication of information, e.g., for storage and/or distribution purposes or so that an image or document can be worked on or shared despite individuals being located at different locations and/or in different time zones. Such needs arise not only in enterprise and business settings where costly and often difficult computer systems may be used to address at least some of these needs, but also in family and home settings where different family members may have different needs but, in many cases, where the family members do not want to use a laptop or stand alone personal computer with the many issues of peripherals devices and operating system configuration issues that are often associated with a personal computer running a complicated operating systems like Windows Vista.

As individual group, e.g., family members, create a data store with various types of data, they may want to set rules allowing one or more other group, e.g., family members, access to some or all of their stored data. While rules might be set for granting access to one or more family members, as a person's life changes over time it can be tedious to have to update access rules as circumstances and/or family relationships change. Furthermore, a person may be unavailable or unable to change rules due to physical issues such as illness or death which might make them physically unable to enter rule changes in a computer system or device.

In view of the above, it should be appreciated that there is a need for methods and apparatus which can simplify the task of updating rules and/or rights with regard to digitally stored content, e.g., as family relationships and/or life events which might make it desirable to change content access rights occur.

SUMMARY OF THE INVENTION

Methods and apparatus of the present invention are suitable for supporting a wide variety of functions including, among others, one or more of: organizing household information, sharing and/or controlling access and/or rights to digitally stored content. The digital assets of one or more household members are stored in secure memory, sometimes referred to as a digital vault. The digital vault may be, and sometimes is, implemented as a secure server connected to one or more household devices via a communications network. Ownership of assets in the digital vault and/or the right to access digital assets in the digital vault can be, and sometimes are, automatically changed based on one or more life events, that can be specified by a user or detected based on the content of one or more scanned documents.

The owner of stored content, e.g., in a secure cloud based digital vault, can set access rules and/or grant access to other individuals in a group, e.g., a family group. Content can be, and sometimes is, organized into categories with each category corresponding to a different type of information, e.g., medical information, personal information, calendar information, legal records, family photos, etc. An owner of content can specify their relationships to another individual, e.g., another family member, and have access and ownership rules apply based on the relationship to the owner of the content and/or specific user specified rules.

Content is automatically added to the digital store, e.g., in response to the content being scanned or entered electronically by the owner. In various embodiments character recognition, e.g. Optical Character Recognition (OCR) processing, is applied to a scanned document. The document type is identified and information in the document taken into consideration with the document being automatically stored and subject to access rules based on automatic determination of the document type, user specified input and/or information in the document.

Various forms such as marriage licenses, leases and/or death certificates are processed and, in some embodiments, determined to correspond to one or more predefined life events which can affect changes as to which access rules are applied to a particular category or set of documents. For example upon scanning of a marriage certificate, one or both spouses listed on the certificate may automatically result in both spouses becoming joint owners of content owned by either spouse individually prior to the marriage. A record of content which was previously individual owned may be, and sometimes is, maintained in the event of a divorce, in which joint access may be revoked. Storage space and access to particular content such as family photos may be, and sometimes is, automatically allocated to children upon birth. In response to death, e.g., as evidenced by a death certificate being scanned, ownership of stored digital content can be, and sometimes is, automatically transferred to a spouse or designated individual. Similarly in the case of a health care condition such or power of attorney being scanned, access and/or management rights to content may be, and sometimes is, automatically granted to the individual listed as the person to whom the power of attorney is granted.

By automatically making changes to content ownership and/or access rights based on default and/or user configurable rules, content ownership and access can be automatically managed and revised based on various life events which may be made known to the system by scanning a certificate such as a marriage certificate, death certificate, birth certificate or other document which serves as legal notice of an event such as a divorce, death, move to a new apartment or household, etc.

The automated rule based approach to controlling content ownership and access can free an individual of the task of updating access privileges and/or ownership information and can be easily implemented by submitting proof of the life event, e.g., by scanning a movement issued document or certificate which can be, and sometimes is, checked in an automated manner and/or by checking government databases to confirm the information obtained by scanning a document.

Various additional features and advantages of the present invention are discussed in the detailed description which follows.

DETAILED DESCRIPTION

Figure 1:
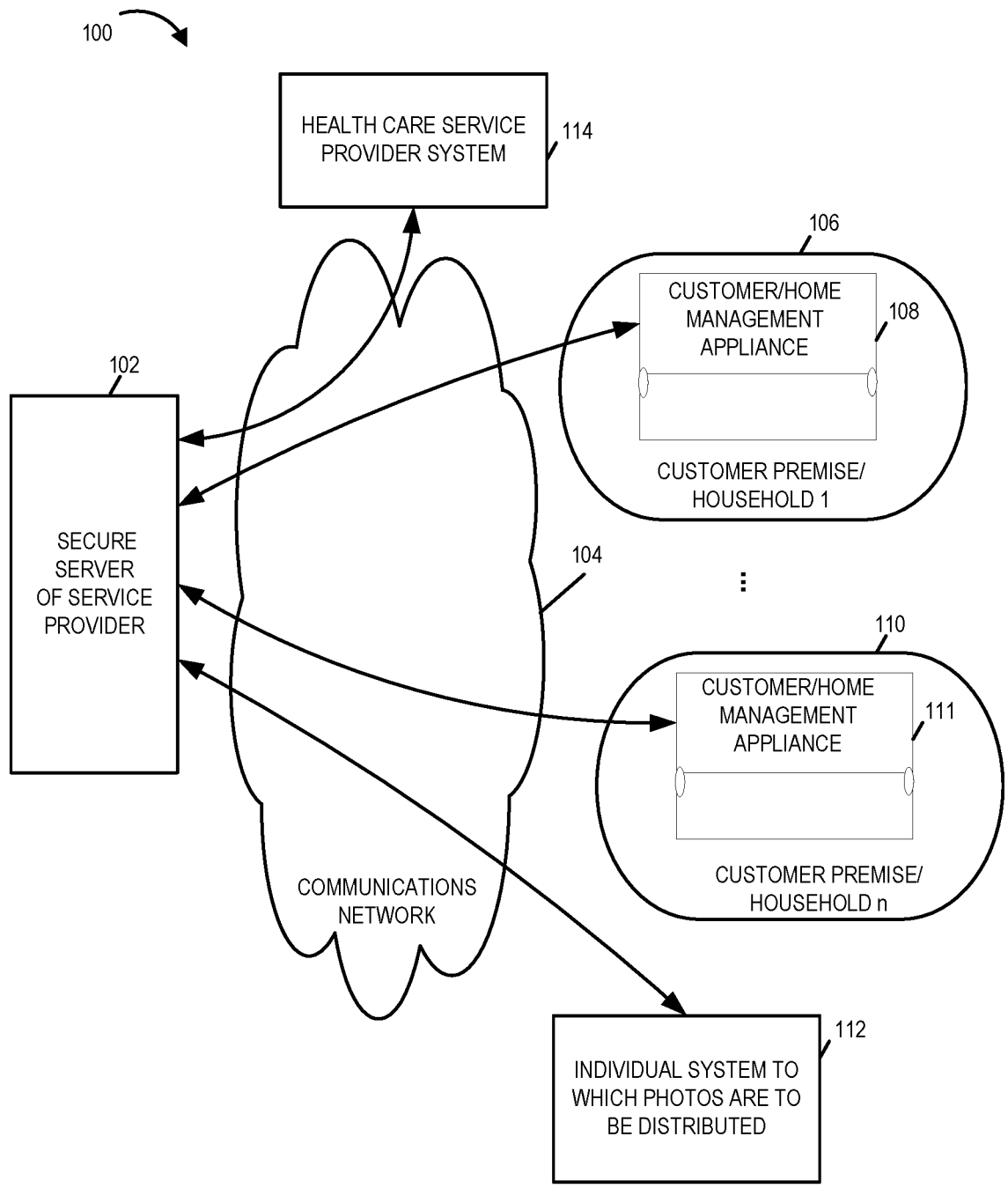
FIG. 1 illustrates an exemplary communications system in which a home appliance and secure server of the present invention may be used.

FIG. 1 illustrates an exemplary system 100 in which one or more appliances, e.g., a home appliances 108, 111 of the invention may be used to input data which can be added to a digital data store. The system 100 includes a secure server 102 of provider of a service, e.g., a home information and/or communications management service, a health care service provider system 114, an individual system 112 to which photos and/or other data is to be distributed and a plurality of customer premise locations 106, 110, e.g., household locations, each of which includes an home appliance 106, 111 implemented in accordance with the present invention. Various elements of the system 100 are coupled together via a communications network 104 which may be the Internet, a public telephone network, or a combination of one or more networks. While the communications network may be a public network, communications links over the network may, and in various embodiments are, secured using encryption and/or other techniques. The communications links between the home appliances 108, 110 may be Virtual Private Network (VPN) communications links. Access to other systems, e.g., the health care service provider system, Internet search provider systems, E-mail systems, etc via the home appliance may be protected by a firewall included in or managed by the service provider's secure server 102. The secure server 102 supports various functions and can interact with the home appliances 108, 111 of the present invention to provide a wide variety of services, information management functions, device information synchronization functions, communication service management functions, etc. in a secure manner. The services/functions supported by the secure server 102 include one or more of the following: i) media (e.g., image/film/document) archiving, documenting and distribution functions, ii) video phone service; iii) conferencing and on-line collaboration functions, e.g., allowing for simultaneous document viewing of documents or images by users each of which has an appliance of the present invention; and iv) monitoring functions such as health monitoring functions; v) communications service management functions, vi) device data synchronization functions; and vii) household bulletin board functions, etc.

Figure 2:
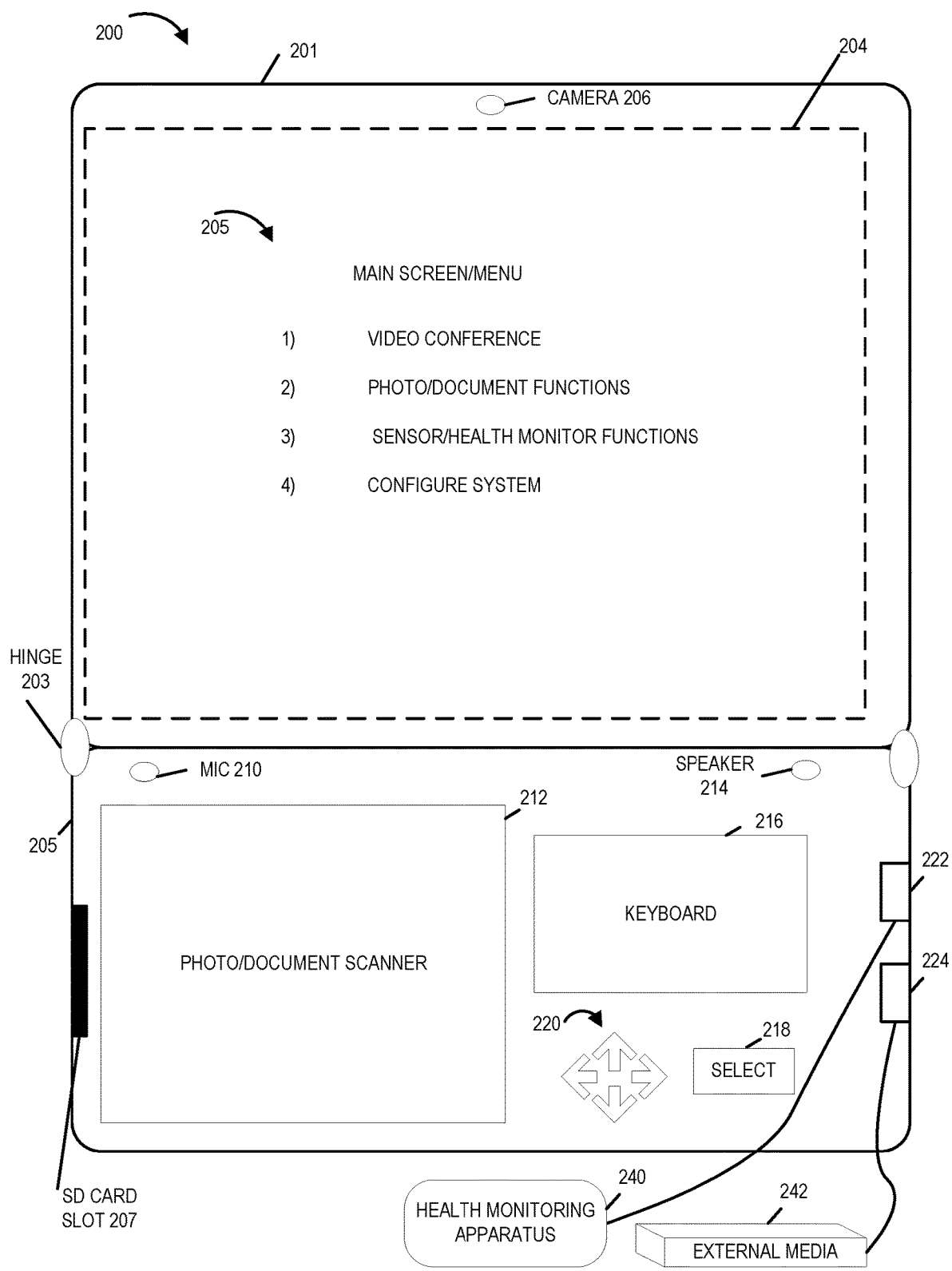
FIG. 2 illustrates an exemplary customer/home management appliance implemented in accordance with the invention which may be used in the system of FIG. 1.

FIG. 2 illustrates an exemplary table top appliance 200 implemented in accordance with the invention. The household appliance 200 includes a housing (201, 205 in combination) which is formed by an upper housing portion 201 and a lower housing portion 205 coupled together by a hinge 203. Mounted to the housing, and thus integral therewith, is a camera 206, display screen 204, a memory card slot 207, e.g., a secure digital (SD) memory card slot, photo/document scanner 212, microphone 210, speaker 214, optional keyboard 216, arrow keys 220, select key 218 and various interfaces 222, 224. The display screen 204 may be, and in some embodiments is, a color touch screen. In various touch screen embodiments, keyboard 216 may be omitted. The interfaces 222, 224 may be wired interfaces, wireless interfaces and/or a combination of wired and wireless interfaces. In the case of wireless interfaces, the interface 222 or 224 may include both receiver and transmitter circuitry for receiving and transmitting signals. Internal to the appliance 200, and thus not visible in the FIG. 2 illustration, is a processor and memory. The processor controls operation of the device under direction of one or more modules, e.g., routines, stored in memory. The memory may also be used to store document images, photo images, etc. However, in order to keep implementation costs low, in some embodiments the apparatus 200 includes a relatively small amount of memory with the appliance relying on network connectivity and network storage for data intensive functions such as storing large photo albums and/or large numbers of documents. Additional storage can be added to the apparatus by inserting a memory card, e.g., SD, XD or other type of memory card, in card slot 207 or by attaching an external media device 242, e.g., a USB hard disc drive, to one of the I/O interfaces 222 or 224. The table top appliance 200 can, and sometimes does, perform optical character recognition and then perform various asset ownership and/or asset management/access control functions based on the scanned or user provided input. In other embodiments the device 200 communicates scanned documents and/or user input.

Various peripheral devices, e.g., a health monitoring apparatus 240, may be added to, e.g., coupled to, the appliance 200, to supplement the stand alone appliance's capabilities. Various peripheral devices used in some embodiments include one or more of the following: a media reader such as one or more of the following: a slide reader, a cassette recorder reader (audio or video), a floppy disk reader, a 78 record playback drive, a reel to real tape reader, a film reader. The various readers digitize analog input which is then processed and stored in digital form, e.g., in one or more files and/or communicated via a communications network, e.g., to a network server for storage and/or distribution.

In some embodiments, where healthcare is supported, the appliance 200 is coupled to a monitoring apparatus for monitoring one or more sensor inputs. The sensor inputs may include one or more human health monitors, motion monitors and/or a variety of environmental condition monitors such as security sensors, temperature sensors, etc. A blood pressure monitor, glucose level monitor, heart rate monitor, and blood oxygen level monitor are among the various sensors and monitors which are used and supported in some embodiments. In some embodiments interface 222 is coupled to a sensor network from which the appliance 200 receives signals used to detect at least one of movement and proximity of a living being.

In some embodiments the appliance is configured to generate an alarm and automatically initiate an audio/video conference in the event motion is not detected at predetermined intervals or during a monitoring period determined according to a programmed schedule. For example, the device may be set to detect motion in the morning and, failing to detect the motion may set off an alarm based on the concern that the resident may have been unable to get up or make to the room in which the appliance is located to take medication at a scheduled time. The device may be set to monitor for audio alarms, e.g., a person yelling for help, or for an alarm signal which may be transmitted to the device 200 by an item worn on an individual expected to use the appliance. In the event of an alarm condition, the appliance may initiate a video conference call in which audio as well as video may be monitored and an individual at the customer premise at which the appliance is located may communicate with an individual at another location, e.g., monitoring location, without having to get up or move, through the automatic use of the microphone (mic) 210 and speaker 214.

In the FIG. 2 example, display 204 illustrates an exemplary opening menu 205. The appliance 200 may be preconfigured to display the opening menu upon power up. The menu 205 lists various selection options including a first option corresponding to a video conference function, a second option corresponding to various photo and/or document functions, a third option relating to sensor and/or health monitoring functions and a fourth option relating to system configuration. Each of the functions may be highlighted by moving around on the screen using arrow keys 220 and by pressing select key 218 to indicate a user selection. Alternatively, in touch screen embodiments, a user of the appliance may select an option by touching the portion of the display screen 204 on which the desired option is displayed.

Upon selection of the video conference option a user is presented with an additional screen that allows a user to initiate or join a video conference, e.g., by entering an identifier corresponding to a party or parties which are to be contacted or by accepting a received invitation to join a video conference initiated by another party, e.g., an individual using another appliance 200 of the present invention.

Upon selection of the photo/document functions option a user is present with a menu that allows the user to maker further selections relating to the scanning of photos or documents including the optional recording of voice commentary and an image of the individual providing the commentary, e.g., as part of creating an electronic collection of photos or documents, e.g., an album, which can be uploaded to a server, stored on the server and/or distributed by the server. Given the limited memory on the system 200, in some embodiments individual images and documents, along with any commentary or image of the person providing the commentary, are uploaded to a server via a network interface with the server then storing the multiple images and compiling them into albums in accordance with input received from the appliance 200.

Upon selection of sensor/health monitor functions, the user is provided with additional options and supported actions relating to the sensors and/or health monitoring peripheral device 240 coupled to the appliance 200. The appliance 200 supports automatic detection and configuration of peripheral devices. Accordingly, as a user adds or removes peripheral devices the options available upon selection of the sensor/health monitoring functions option will change depending on the sensors/health monitoring apparatus present at a particular point in time.

Upon selection of the configure system option, a user is provided with various configuration options, e.g. display and other setting options. A user may provide a security key, e.g., a Wired Equivalent Privacy (WEP) key, required to obtain wireless connectivity to a local network via setting entry options presented after the configure system option is selected. While a user may configure the appliance 200 manually, the device can also be configured remotely, e.g., by a server in the network to which the apparatus 200 is connected. A telephone interface and pre-programmed telephone number may be included in the apparatus 200 for obtaining configuration information via the public telephone network. However, where wireless or other Internet connectivity is supported, the appliance may connect via such a connection to a network based server to obtain additional or updated configuration information or to download new application software, e.g., relating to one or more peripheral devices which may be added to the apparatus 200.

Figure 3:
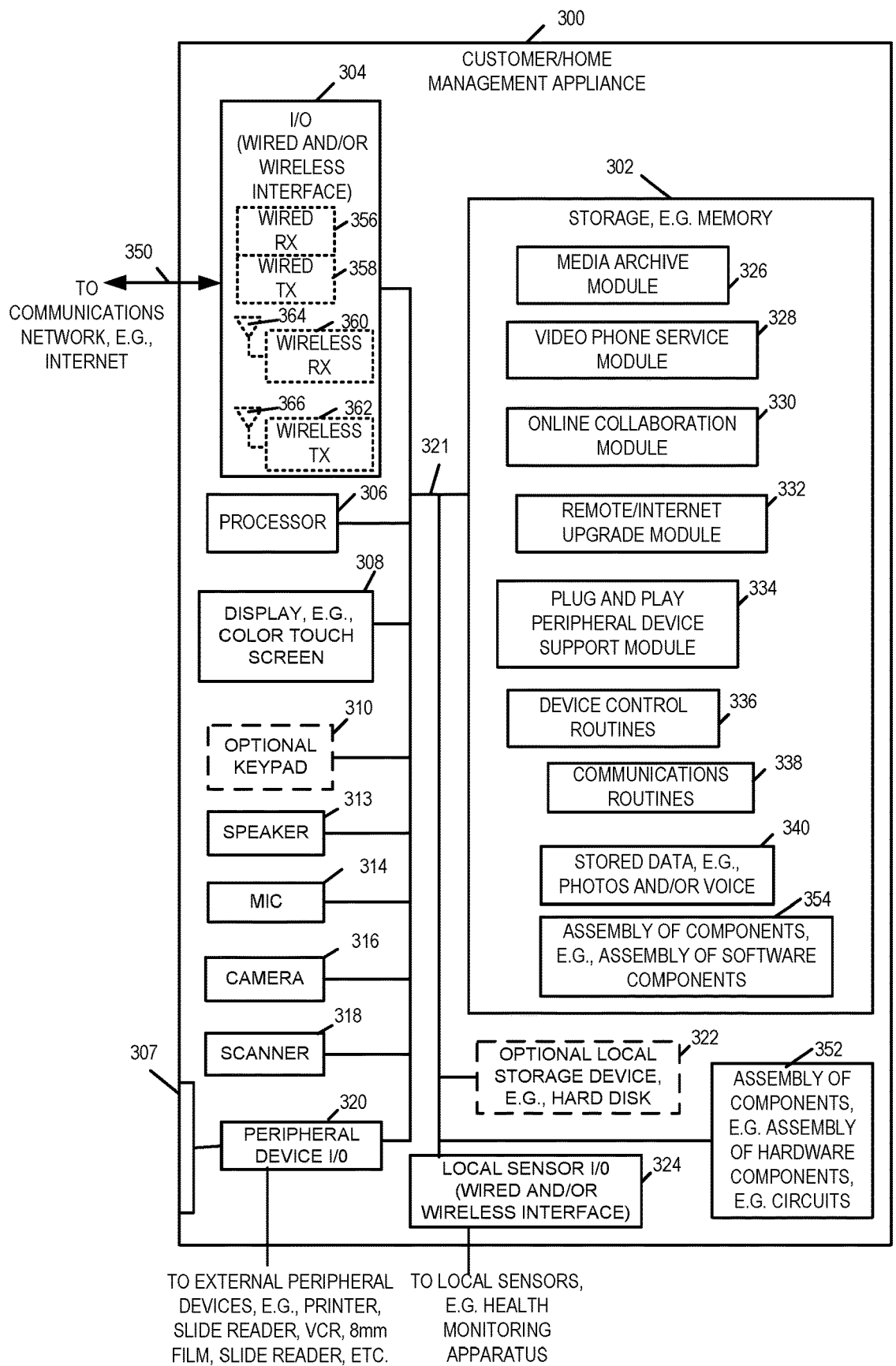
FIG. 3 is a more detailed illustration of the exemplary customer/home management appliance shown in FIG. 2

FIG. 3 illustrates, in block diagram form, a customer appliance 300 implemented in accordance with one exemplary embodiment of the present invention. The appliance 200 may include the same elements as the appliance 300 shown in FIG. 3. The appliance 300 includes a input/output interface 304, processor 306, assembly of components 352, e.g., assembly of hardware components, e.g., circuits, display 308, optional keypad 310, speaker 313, microphone 314, camera 316, scanner 318, peripheral device I/O 320, memory 302, optional local storage device 322 and a local sensor I/O 324 coupled together by a bus 321 which allow the various components to exchange data and other signals. The various components are securely, e.g., permanently, mounted to a housing and thus are integral to the appliance 300. The housing may be a single fixed assembly or a multi-part housing such as the multipart housing including upper and lower parts 201, 205 shown in the FIG. 2 example.

The I/O module 304 severs as a network interface and coupled the appliance 300 to a communications network, e.g., the Internet and/or public telephone network as indicated by communications link 350. The I/O may be implemented as a wired and/or wireless interface. In some embodiments, I/O interface 304 includes wired receiver (RX) 356 and wired transmitter (TX) 358. In some embodiments, I/O interface 304 includes wireless receiver (RX) 360 coupled to receive antenna 364 and wireless transmitter (TX) 362 coupled to transmit antenna 366. In one embodiment the I/O 304 includes an Ethernet port for connection to wired networks, a telephone jack for connection to standard telephone networks and also a wireless interface, e.g., a WiFi interface for connecting to a wireless network. Other types of network interfaces can be supported such a conventional cell phone interfaces thereby allowing the customer appliance to communicate with other devices and network servers using any one of a wide variety of communications networks.

Processor 306 controls operation of the customer appliance in accordance with one or more control routines stored in memory 302. The processor 306 controls, among other things, the presentation of menus and prompts on display 308 and the disposition of scanned images and/or other files in accordance with user input, e.g., menu selections and destination information, which may be entered by a user of the customer appliance 300. The display screen 308 is used for displaying menus, scanned images, and other information. In some embodiments the display screen 308 is implemented as a color touch screen. In touch screen embodiments the keypad 310 may be omitted. Accordingly the keypad 310 is shown as an optional element. In order to provide audio output, e.g., to allow for the playback of recorded commentary and/or to support audio output as part of a video conference call, the appliance 300 includes speaker 313. To support capture of audio, e.g., to allow for recording of picture commentary and/or the input of voice as part of a video conference call, the appliance 300 includes mic 314.

Camera 316 is provided for capturing still images and/or video of the user of the appliance 300. In the case of commentary provided relating to a scanned photo, the camera can, and in some embodiments is, used to capture an image or video of the person providing the commentary. The camera 316 also supports video capture enabling video conference calls from the appliance 300. The camera 300 is usually mounted at a location on the appliance housing from which the image of a user of the appliance can be easily captured. In some embodiments, the camera 316 is mounted above the display screen 308 as shown in FIG. 2.

Scanner 318 allows photos to be scanned. Scanned images may, and in some embodiments are, automatically reoriented prior to display thus allowing an image to be scanned in any direction with the appliance re-orienting the image after scanning. In some embodiments scanner 318 is implemented as a small flatbed scanner capable of scanning 3×5 images. Such a size is well suited for standard photos. Larger scanning bed sizes may also be used. In other embodiments the scanner is implemented as a device having a slot or feed input and the item to be scanned is moved over a scanning area. Accordingly, depending on the particular embodiment, the scanner 318 may be implemented in different formats. The scanner 318 can be used as a document scanner allowing documents to be scanned and displayed as part of a video phone conference.

The peripheral device input/output interface 320 serves to interface the device 300 with a variety of external optional peripheral devices as well as a memory card slot 307. The memory card slot 307 allows for memory cards often used for the storage of photos to be read and/or written. Thus, not only can the appliance 300 be used to document and archive physical photos which can be scanned, but can also be used to add commentary to images which were captured by a modern digital camera. Thus, the appliance 300 remains relevant and useful even as a user may migrate from film and photos to electronic cameras and electronic photos.

Among the peripheral devices which are supported by the interface 320 are various optional peripheral devices such as a printer, slide reader, VCR, 8 mm film reader, slide reader, etc. These peripheral devices may be purchased by a user at the time of purchase of the appliance or later, e.g., on an as needed basis. Peripheral devices added to the customer appliance 300 are automatically detected, configured if necessary and the added functionality and menu options made possible by the addition of the peripheral device are automatically added by the appliance 300 to its set of menus. The peripheral device I/O interface 320 may support USB devices. In addition to the interface 320, a sensor interface 324 is provided for receiving local sensor input. The sensor interface 324 may include a wired and/or wireless receiver/transmitter. A large variety of sensors may interface with the appliance 300 via the local sensor I/O interface 324. Sensors which may be coupled to the appliance 300 via interface 324 include, e.g., health monitoring sensors, motion sensors, alarm sensors, etc. As discussed above, peripheral devices in the form of medical sensors may be paid for and coupled to the appliance 300 at any time. Thus, a user of the system 300 may purchase the system for, e.g., photo and video conferencing functions, and an insurance company may purchase and provide the user a health monitoring device at some later time to be used with the appliance 300, e.g., at the insurer's expense. Health monitoring devices may include blood sugar level monitors, blood pressure monitors, heart rate monitors, etc which may be coupled to the device 300 via interface 324. Information provided by sensors via interface 324 can, and in various embodiments are, uploaded by the appliance 300 to a network server for forwarding to a health care provider, e.g., a doctor or health insurance provider. Thus, the appliance 300 can be used to support health monitoring functions in addition to supporting video conferencing and photo achieving.

Appliance 300 can be, and in some embodiments is, configured to detect various alarm conditions and take action in response to an alarm condition. For example, in response to the failure to detect expected motion, or in response to detecting sudden motion indicative of a fall, the appliance 300 may initiate an audio or video conference with a monitoring service or healthcare provider which can then assess the situation and make an informed decision as to whether or not to send, e.g., dispatch, medical help. Smoke and/or heat sensors may be used to trigger a fire alarm which, like a medical alarm, may trigger a video conference call which can result in emergency service personal being dispatched, e.g., fire fighters and/or police may be dispatched to the customer premise.

For cost reasons the memory 302 may be relatively small. The memory 302 may be non-volatile and can be used to store various modules, e.g., routines, which support various device functions. In addition memory 302 may have the capacity to store a limited number of photos and corresponding audio/video commentary which can then be uploaded to a network storage device via network interface 302.

In the FIG. 3 embodiment, memory includes a media archive module 326, a video conference call module 328, an online collaboration module 330, remote/Internet upgrade module 332, a plug and play peripheral device support module 334, device control routines 336, communications routines 338 and stored data 340, e.g., photos and/or audio/video commentary.

While memory 302 may be somewhat limited in size for cost reasons, in some embodiments an optional local storage device 322, e.g., a hard disk, is included to provide for ample storage for digital images, video and audio on the appliance 300. Cloud or network storage is also supported making optional local storage device 322, e.g., the hard disk, less important in cases where reliable network connectivity is available.

Media archive module 326 controls the scanning, documentation (audio and/or video documentation) of images such as photos and physical documents. As discussed above, photos can be scanned, stored in digital form with captured audio and/or video commentary and distributed, e.g., via the I/O interface 304, e.g., a network interface, under control of media archive module 326. Video conference module 328 is responsible for handling video conference call establishment and video conference call maintenance. On-line collaboration module 330 allows users to establish on-line collaboration sessions which may involve use of the video conference capabilities available from module 328 as well as document exchange capabilities made possible by the availability of the scanner 318. Remote/Internet upgrade module 332 allows for the appliance 300 to exchange data and/or control information with a remote server via a communications network such as the Internet or a public telephone network. Remote upgrade module 332 makes it possible for the routines in memory 302 to be updated, added to or replaced via a remote network server. Thus, new applications and routines may be retrieved and installed automatically, e.g., as new peripheral devices are detected. Plug and play peripheral device support module 334 is responsible for detecting new peripheral devices, retrieving corresponding applications or routines from the network if required, automatically install the retrieved routines and for taking any other action required to automatically support various peripheral devices attached to the customer appliance 300. The plug and play support made possible by module 334 allows a user to add supported peripheral devices without have to be concerned with having to manually configure the appliance 300 to support the peripheral device.

Device control routines 336 include a variety of routines, including alarm generation and detection routines, data storage control routines, etc. that support or control the device to operate in accordance with the methods of the present invention.

Communications routines 338 support voice and data communications and enable communications sessions to be established via the appliance 300. Stored data 340 includes stored photos, voice and/or image data corresponding to commentary relating to scanned or input photos or documents. The stored data 340 may also include menu information and/or other system configuration information. The system configuration information may be preloaded and/or automatically updated as peripheral devices as added and/or the device is reconfigured to support new applications. Updating of configuration information stored in memory 302 may be done automatically by a remote server coupled to the customer appliance 300 via a communications network. Data 340 may include alarm settings which determine when a video conference call is to be initiated, e.g., in response to a fall sensor, heat sensor, smoke alarm or another monitoring device which may supply signals to the customer appliance 300. Storage 302, e.g., memory, further includes an assembly of components, e.g. assembly of software components, e.g. software routines and/or software modules.

In view of the above discussion, it should be appreciated that the appliance of the present invention is easy to set up, simple to use, supports a wide variety of applications and can be updated remotely and/or through the addition of add on peripheral devices which can increase the number of supported functions. The appliance of the present invention supports enough functions that it can appeal to a wide range of family members and/or age groups. Since purchase of the appliance can be justified by the many non-health related functions it supports, purchase of the appliance can be motivated without using the health monitoring features as a primary reason to purchase the appliance. Health care providers can cover the cost or supply health monitoring related peripheral devices and can take advantage of the remote reporting and alarm features supported by the appliance thereby potentially reducing the cost of health care services without saddling health insurance companies with the cost of the communications interface and/or network related costs that might be associated with having to provide a complete monitoring system.

Figure 4:
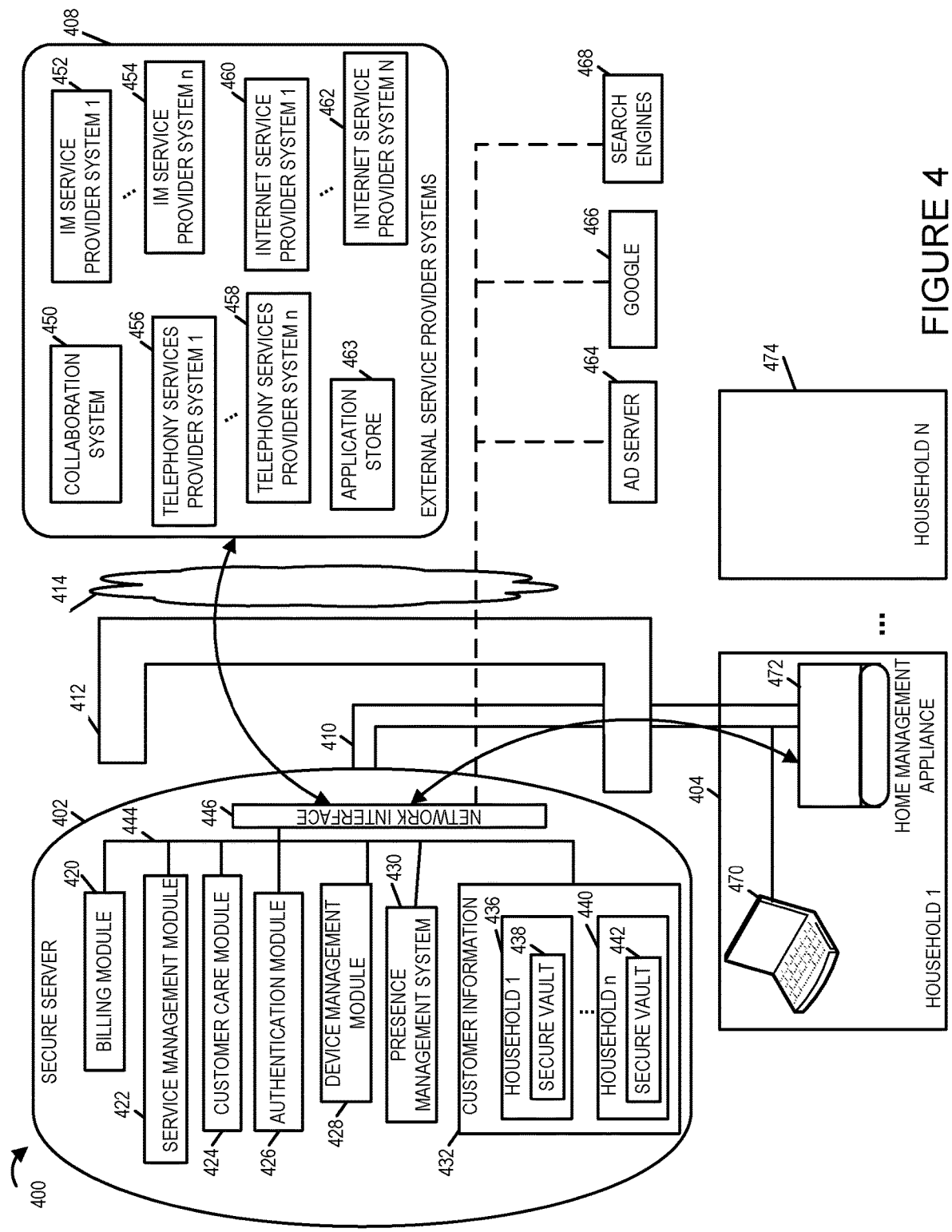
FIG. 4 is another exemplary communications system implemented in accordance with the present invention which includes more detail than is included in FIG. 1.

FIG. 4 illustrates an system 400 implemented in accordance with the present invention in more detail than the FIG. 1 illustration. As illustrated in FIG. 4, a variety of households 404, 474 include a home management appliance 472 implemented in accordance with the present invention and one or more other electronic devices 470 which can be used to access and distribute information, e.g., household member schedule information, contact information, etc.

The households 404, 474 are coupled to the secure server 402 via secure communications links such as the link 410.

The secure links may pass over a public communications network such as the network 414, e.g., the Internet or public telephone network, but are secured through the use of one or more security techniques, e.g., encryption techniques. The link 410 may be a VPN communication link. A firewall 412 protects the secure server from security threats and also protects the home management appliance 472 from security threats. Commutations from the home management appliance to Internet sites, communications services, E-mail servers, etc are routed through the secure server 402 and firewall 412 to protect the home management appliance 472 from security threats without imposing the need for the user of the home management appliance to manage or even be aware of the firewall 412.

The software and/or other applications are loaded on to the home management appliance via the secure server 402. In some embodiments the user is prohibited from loading applications or software onto the home appliance except via the secure server 402. Thus, the secure server 402 can check applications before they are loaded onto the home appliance greatly reducing the threat of accidental loading of viruses and also allowing the secure server 402 to make sure that only compatible applications are loaded onto a home appliance. The secure server 402 may be responsible for updating appliance settings and configuration as applications are loaded and used in combination on the home appliance. Since home appliance configuration and management issues are implemented on the secure server 402 by the service provider, the household member using the home management appliance 472 is shielded from many device management and configuration issues commonly encountered when software and peripherals are loaded onto or added to personal computers.

The secure server 402 includes various modules in addition to customer, e.g., household information. The modules include a billing module 420, a service management module 422, a customer care module 424, an authentication module 426, a device management module 428, a presence management module 430. The various modules can interact with the home management appliance 472 via network interface 446 and also with other external systems 408 via the interface 446. The customer information 432 includes information 436, 440 corresponding to each of the households 404, 474 serviced by the secure server 402. The household information 436, 440 includes information stored in a secure manner, e.g., information stored in what is referred to as a secure vault 438, 442. The information in a household's secure vault may be encrypted and is normally backed up. The secure vault 438, 442 used to store household information may be distributed over a number of storage devices and may be implemented using a secure cloud based storage embodiment and need not be, but may be, implemented using storage internal to the secure server 402.

External service provider systems 408 which may be accessed from the home management appliance 472 via the secure server 402 include a collaboration system 450. one or more telephone service provider systems 456, 458, one or more instant message service provider systems 452, 454, an application store 463, and one or more internet service provider systems 460, 462. Various other external devices such as ad server 464, a Google server 466 and a search engine server 468 may also be accessed via the home management appliance 472 and secure server 402. While not shown in FIG. 4, one or more health care service provider systems 114 may also be accessed via home management appliance 472 and secure server 402.

The secure vault 438 can be used to store medical records, receipts, business records, photos, schedule information, to do lists, etc. with the amount of access to such information being controlled and/or restricted based on information entered via the home management appliance 472 of the household 404 to which the secure vault 438 corresponds. A user of the home management appliance 472 can manage a household's communications services, including the porting of telephone numbers and change of telephone service providers, directly from the home management appliance 472 by providing change/service management information to the secure server 402. The service provider operating the secure server 402 then contacts the various service providers which need to make changes to implement the requested communications service changes in a secure manner eliminating the need for the user of the home management appliance 472 to directly contact the individual communications service providers affected by the requested change in communications service. E-mail, instant messaging and other communications services used by household members can also be managed in a secure manner from home management appliance 472.

Figure 5:
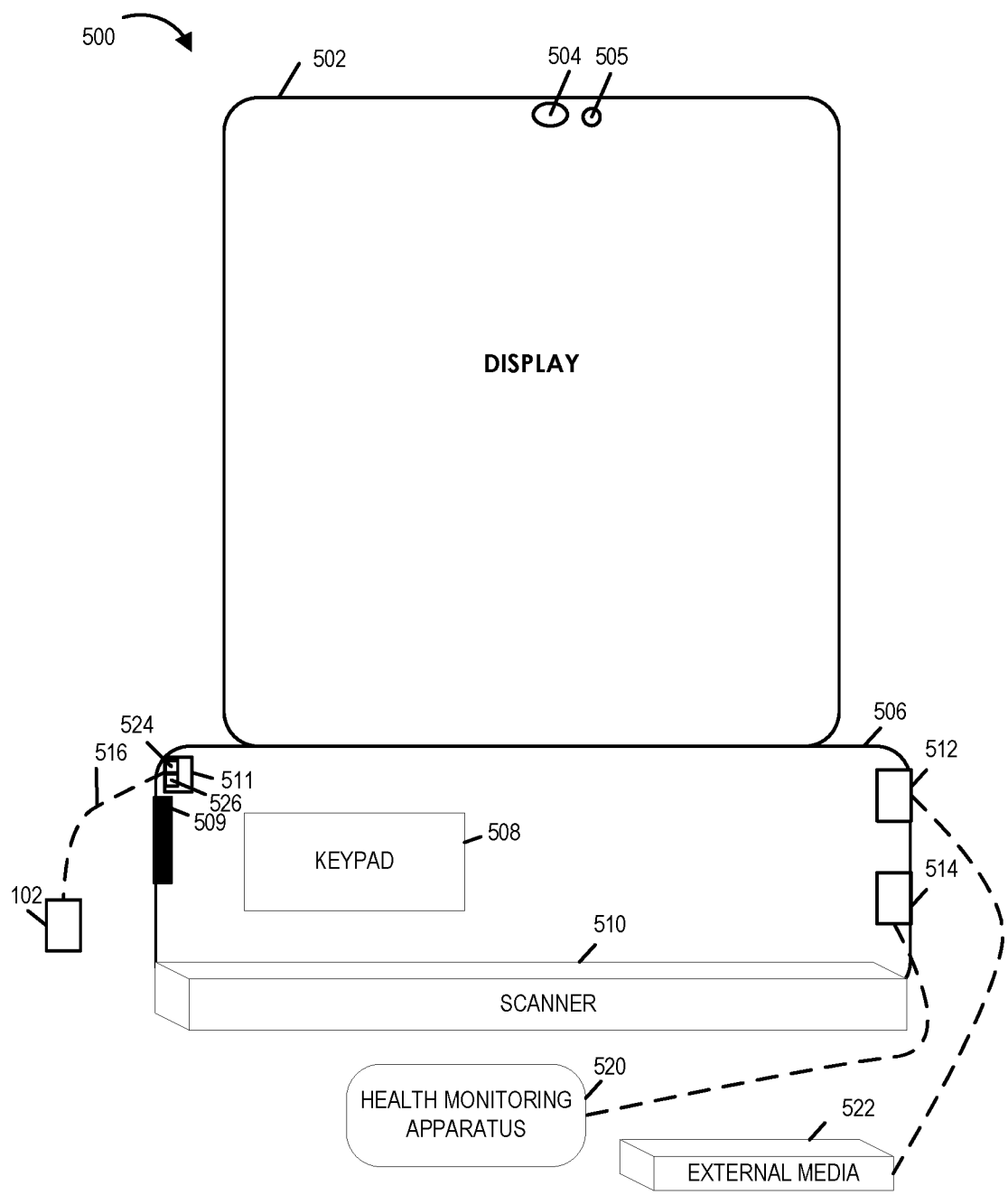
FIG. 5 illustrates a home appliance with a detachable display and scanner implemented in accordance with one exemplary embodiment.

FIG. 5 illustrates an exemplary home appliance 500 which may be used as the home appliances shown in FIGS. 1 and 4. The home appliance 500 includes a display 502, base unit 506 and scanner 510. The display device 502 may include a camera 504 and/or mic 505 and may be touch sensitive. The scanner 510 may be integrated with the base unit 506 or detachable. In some embodiments, the base unit 506 includes a keypad 508. The base unit 506 includes interfaces 512, 514 for coupling the base unit 506 to external peripheral devices such as health monitoring apparatus 520 and external media 522. The base unit 506 further includes memory card slot 509. The base unit 506 also includes an interface 511 for securely coupling the base unit 506 to the secure server 102 via a communications network 516. Interface 511 includes a receiver 524 and a transmitter 526.

Figure 6:
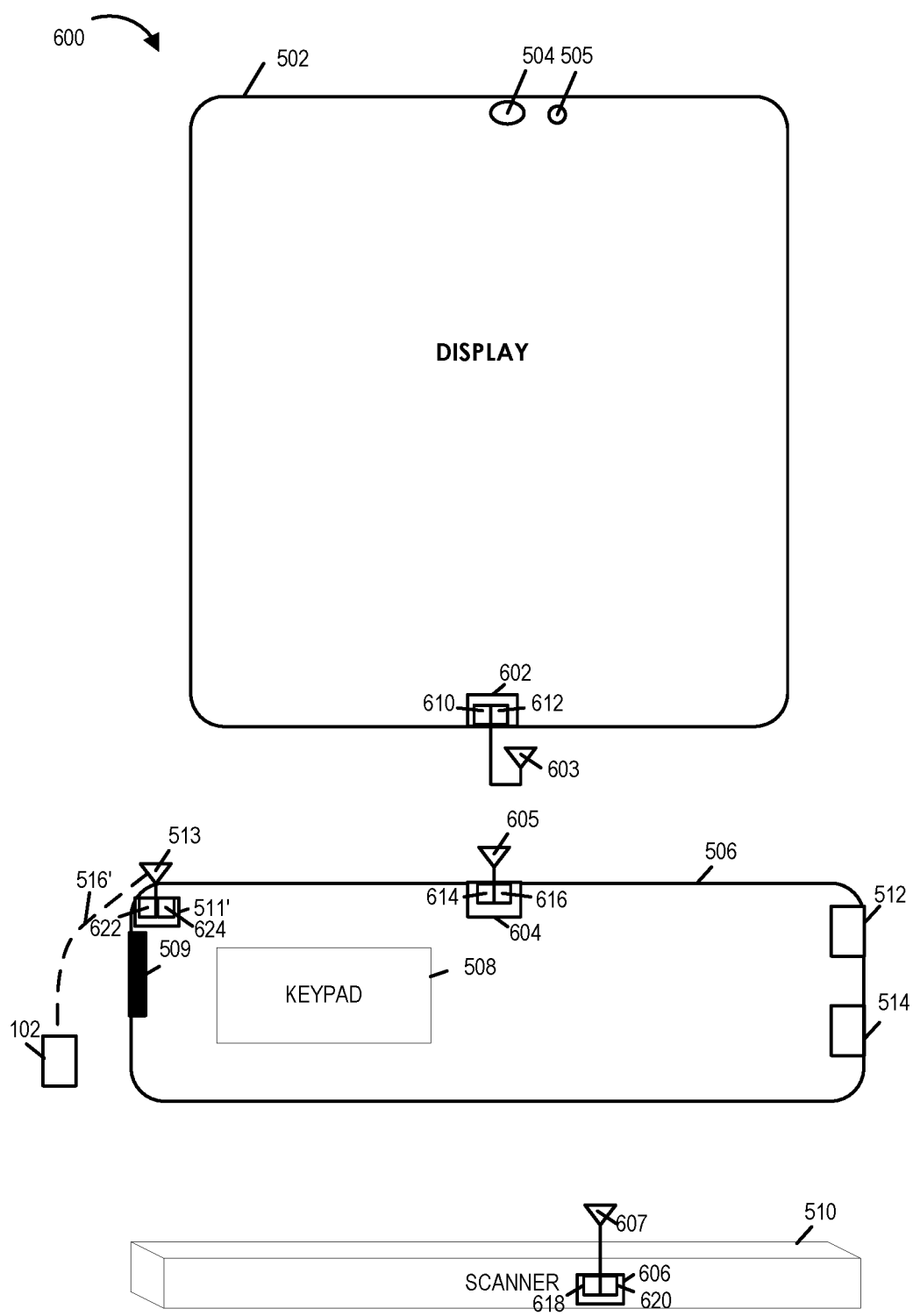
FIG. 6 shows how the components of the system shown in FIG. 5 can be detached from one another and used as they communicate wirelessly with each other.

FIG. 6 illustrates an exemplary home appliance 600 which may be used as the home appliances shown in FIGS. 1 and 4. The home appliance 600 includes a display 502, base unit 506 and scanner 510. FIG. 6 shows how, in one embodiment the display 502, base unit 506 and scanner 510 may be detached from one another. The various components (502, 506, 510) may communicate wirelessly with one another, e.g., via wireless interfaces (602, 604, 606), and corresponding antennas (603, 605, 607), respectively. Wireless interface 602 includes a wireless receiver 610 and a wireless transmitter 612. Wireless interface 604 includes a wireless receiver 614 and a wireless transmitter 616. Wireless interface 606 includes a wireless receiver 618 and a wireless transmitter 620. The display device 502 may be a tablet type device including a touch sensitive screen, display capability, some processing capability and the ability to wirelessly interact with the base unit 506, e.g., a base station, and via the base station 506, including wireless interface 511' and antenna 513' and wireless communications link 516', the secure server 102. Wireless interface 511' includes a wireless receiver 622 and a wireless transmitter 624.

Figure 7:
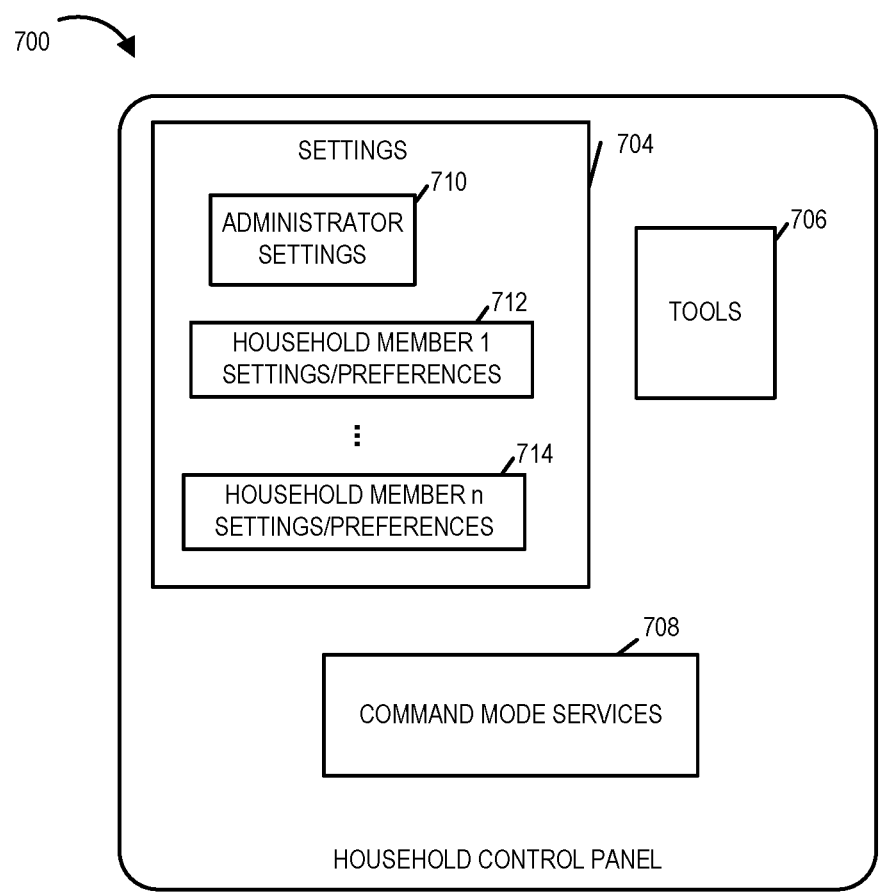
FIG. 7 illustrates a household control panel which may be accessed via the home appliance of the present invention.

FIG. 7 illustrates a household control panel 700 implemented in accordance with one embodiment of the present invention. The household control panel 700 may be displayed on the display 502 and accessed via the home management appliance. Functions and/or services provided via the control panel may be implemented partially or fully on the secure server 102. Exemplary household control panel 700 includes a settings portion 704, a tools portion 706 and a command mode services portion 708. The setting portion 704 includes administrator settings 712, and household settings/preferences corresponding to each household member (household member 1 settings/preferences 712, . . . , household member n settings/preferences 714).

Figure 8:
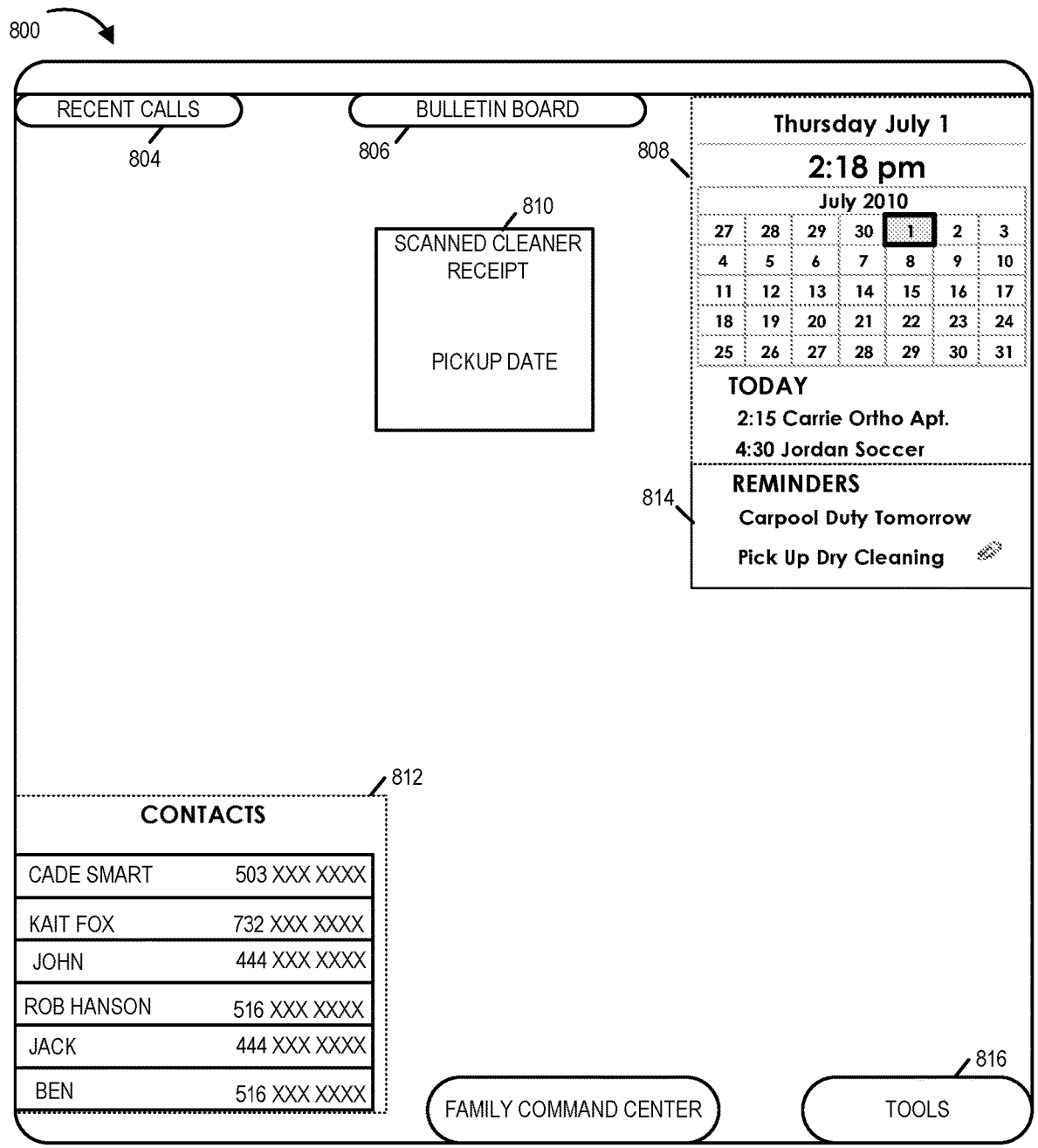
FIG. 8 illustrates a family command and control center screen which may be accessed and used to communicate household information, access household calendars, etc.

FIG. 8 illustrates a family command center 800 which may be displayed on and accessed via the home management appliance. The family command center 800 is an application and corresponding display interface which allows for the management of a wide variety of household information including scanned receipts 810, contacts 812, reminders 814, a calendar 808, call information 804, a bulletin board 806 which can be used for posting notes and/or other information intended for multiple family members, and tools 816.

Figure 9:
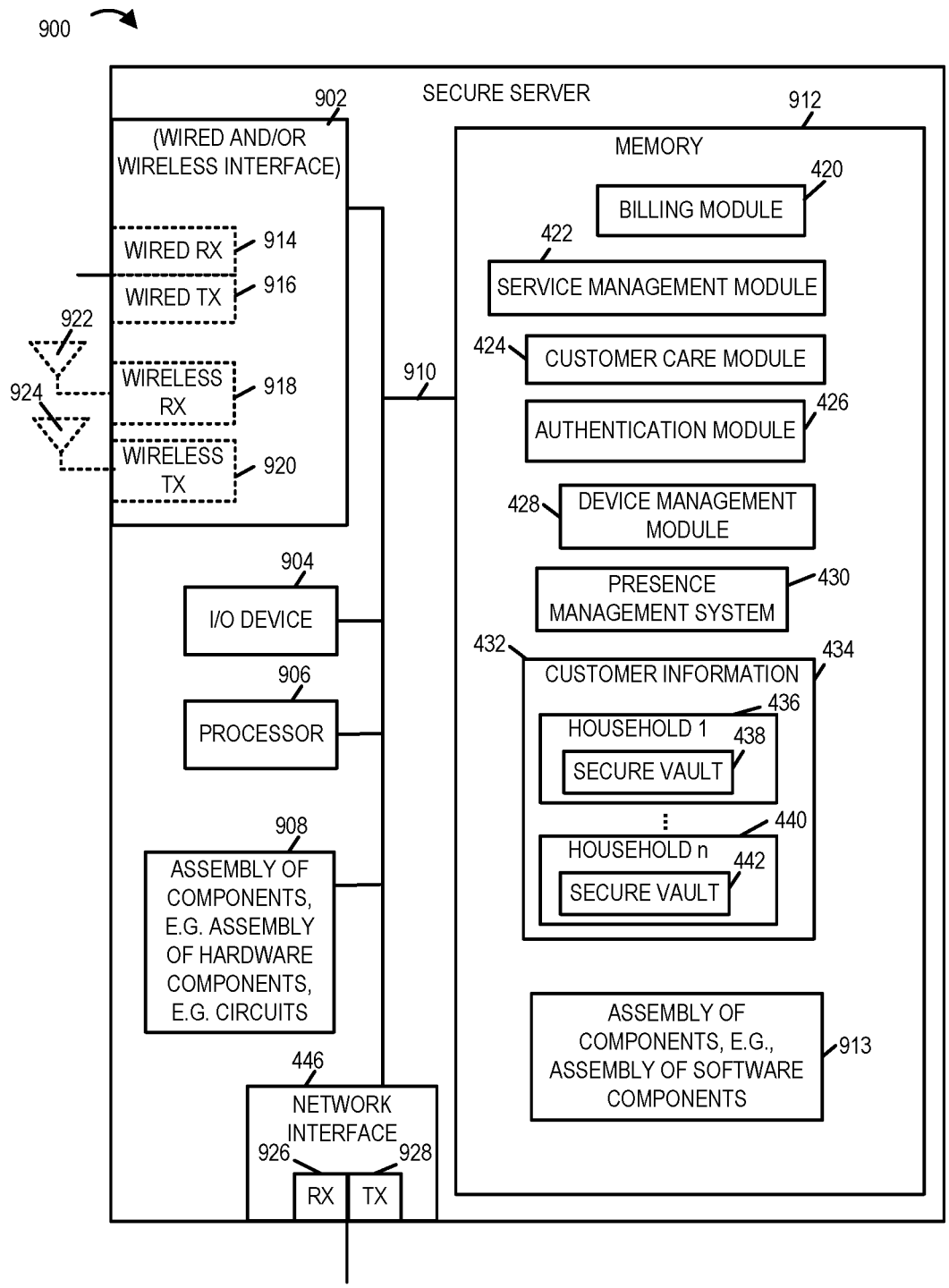
FIG. 9 illustrates a secure server which may be used as the secure server of the system shown in FIGS. 1 and 4, and which interacts with the home appliance in a secure manner to provide a wide range of services to a household and the various members of a household.

FIG. 9 is a drawing illustrating a secure server 900 which may be used as the service provider secure server (102 or 402) of the systems shown in FIGS. 1 and 4. Secure server 900 includes a wired and/or wireless interface 902, I/O device 904, processor 906, e.g., a CPU, assembly of components 908, e.g., an assembly of hardware components, e.g. circuits, network interface 446, an memory 912 coupled together via a bus 910 over which the various elements may interchange data and information. Memory 912 includes billing module 420, service management module 422, customer care module 424, authentication module 426, device management module 428, presence management system 430, customer information 432, and assembly of components 913, e.g., an assembly of software components, e.g. software routines and/or software modules. Customer information 432 including sets of household information corresponding to a plurality of different households (household 1 data/information 436, . . . , household n data/information 440. Household 1 data/information 436 includes secure vault 438. Household n data/information 440 includes secure vault 442.

Wired and/or wireless interface 902 includes one or more or all of: wired receiver (RS) 914, wired transmitter (TX) 916, wireless receiver (RX) 918 coupled to receive antenna 922, and wireless transmitter (TX) 920 coupled to transmitter 924. In some embodiments, the wireless receiver 918 and wireless transmitter 920 use the same antenna or same set of antennas. Network interface 446 includes a receiver (RX) 926 and a transmitter (TX) 928.

Figure 10:
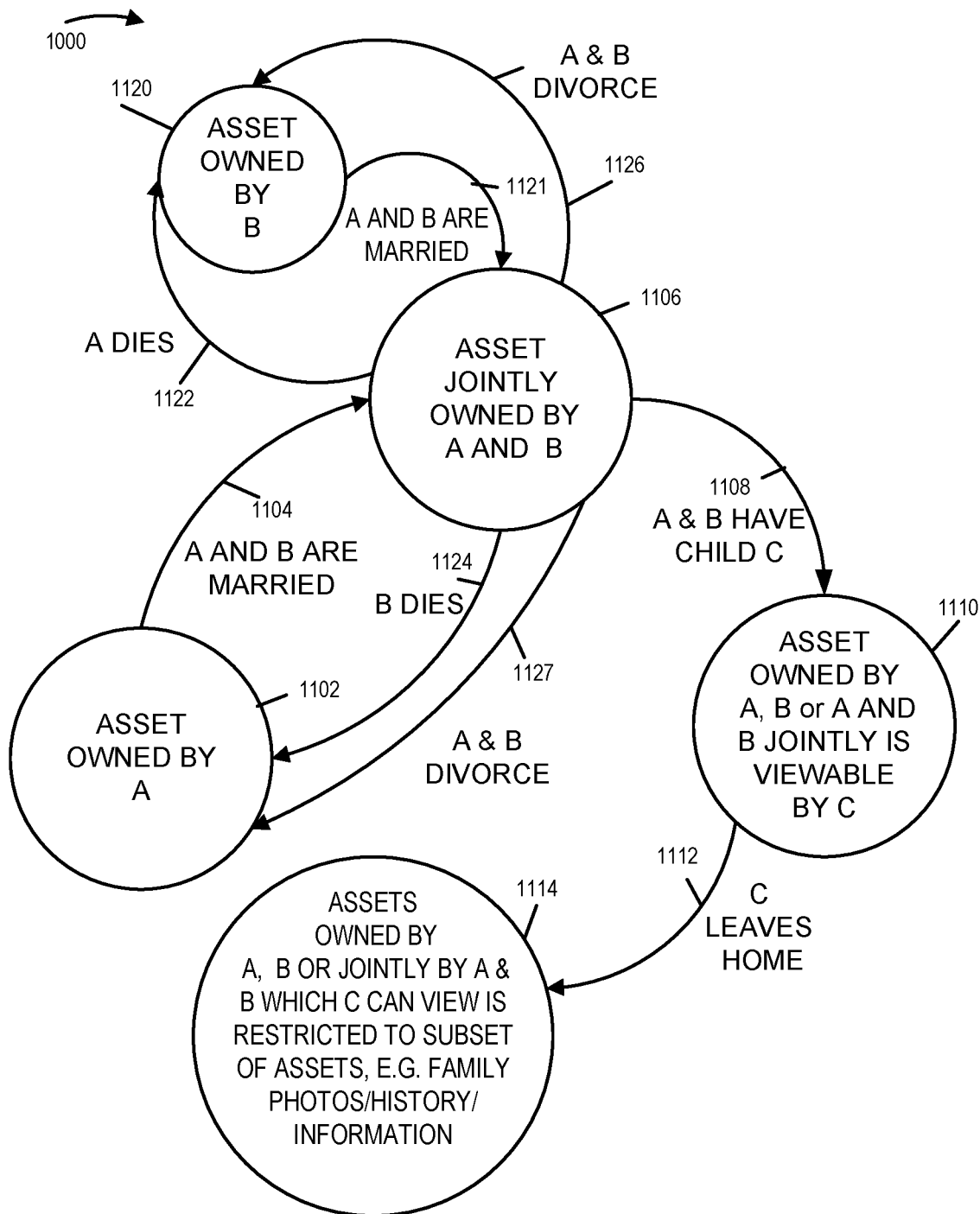
FIG. 10 illustrates how asset ownership and/or access rights may be, and sometimes are, automatically changed in response to one or more life events that can be specified by a user and/or determined or verified based on one or more scanned documents.

FIG. 10 illustrates how asset ownership and/or access rights may be, and sometimes are, automatically changed in response to one or more life events that can be specified by a user and/or determined or verified based on one or more scanned documents.

The diagram 1000 shows a variety of asset ownership/access states 1120, 1106, 1110, 1102, 1114 and the corresponding life events that can be indicated by a user and/or automatically detected by scanning a document such as a marriage certificate, death certificate, birth certificate, divorce document, lease indicating a child has moved to a new address. Arrows are used to indicate transitions, e.g., changes in ownership and/or access that can be and sometimes is implemented automatically in response to detection of the corresponding event.

For example, state 1120 represents the existence of a set of digital assets which are owned by a person represented by the letter B. Ownership of the stored assets, e.g., records, pictures, legal documents, audio records, etc. transitions in step 1121 to a joint asset ownership state 1106 in response to detection of a marriage between individual A and individual B. State 1106 indicates the state of jointly owning assets stored in the digital vault maintained for the family including married individuals A and B. The ownership state of the assets maintained for the coupled A, B changes in response to detecting one or more conditions such as death of individual A, death of individual B or divorce of A & B.

In the case of death of individual A ownership of the assets stored in the digital store that are jointly owned by A and B automatically transitions in step 1122 to ownership by individual B 1120. In the case of death by individual B ownership of assets stored in the digital store that are jointly owned by A and B automatically transitions in step 1124 to ownership by individual A 1102.

In the case of divorce of married couple assets which are jointly owned 1106 are divided between A & B based on previous ownership and/or a divorce document. Steps 1126 and 1127 represent the transition of assets form the joint ownership state 1106 to the individual ownership states 1120, 1102 as a result of divorce.

Detection of a birth or adoption of a child can, and sometimes does, trigger automatic creation of a secure data store in the family digital vault for the child while also automatically granting the child access rights to some or all of the parents data stored in the family data vault, e.g., maintained by the secure server 402. These operations are represented by step 1108.

A child leaving a home, e.g., as indicated by the scanning of a lease with the child's name and new home address on it, can, and sometimes does, trigger an automatic change in the child's right to access content corresponding to his/her parents as represented by step 1112. After a determination is made that a child has left the family home the child is still permitted to access some portions 1114 of the family vault, e.g., the portions including general family history, family photos and the child's own personal information but may be, and sometimes is, restricted from access to some other content in the family vault the child had access to prior to leaving the home. The content which the children are to have access to can be, and sometimes are, determined by general rules specified by one or both the parents which can be applied uniformly to one or more children whenever a child is detected on indicated to have left the home.

The ownership and access changes may be, and sometimes are, determined by the customer home appliance 300, e.g., under control of the processor included therein, based on user input and/or one or more scanned documents and then communicated via a communications network to the secure server which maintains the secure family vault. In other embodiments the home appliance or another device provides user input and/or scanned documents to the secure server 402 which then makes asset ownership and/or asset access changes, e.g., in accordance with the diagram of FIG. 10 and/or the method shown in FIG. 11.

Figure 11A:
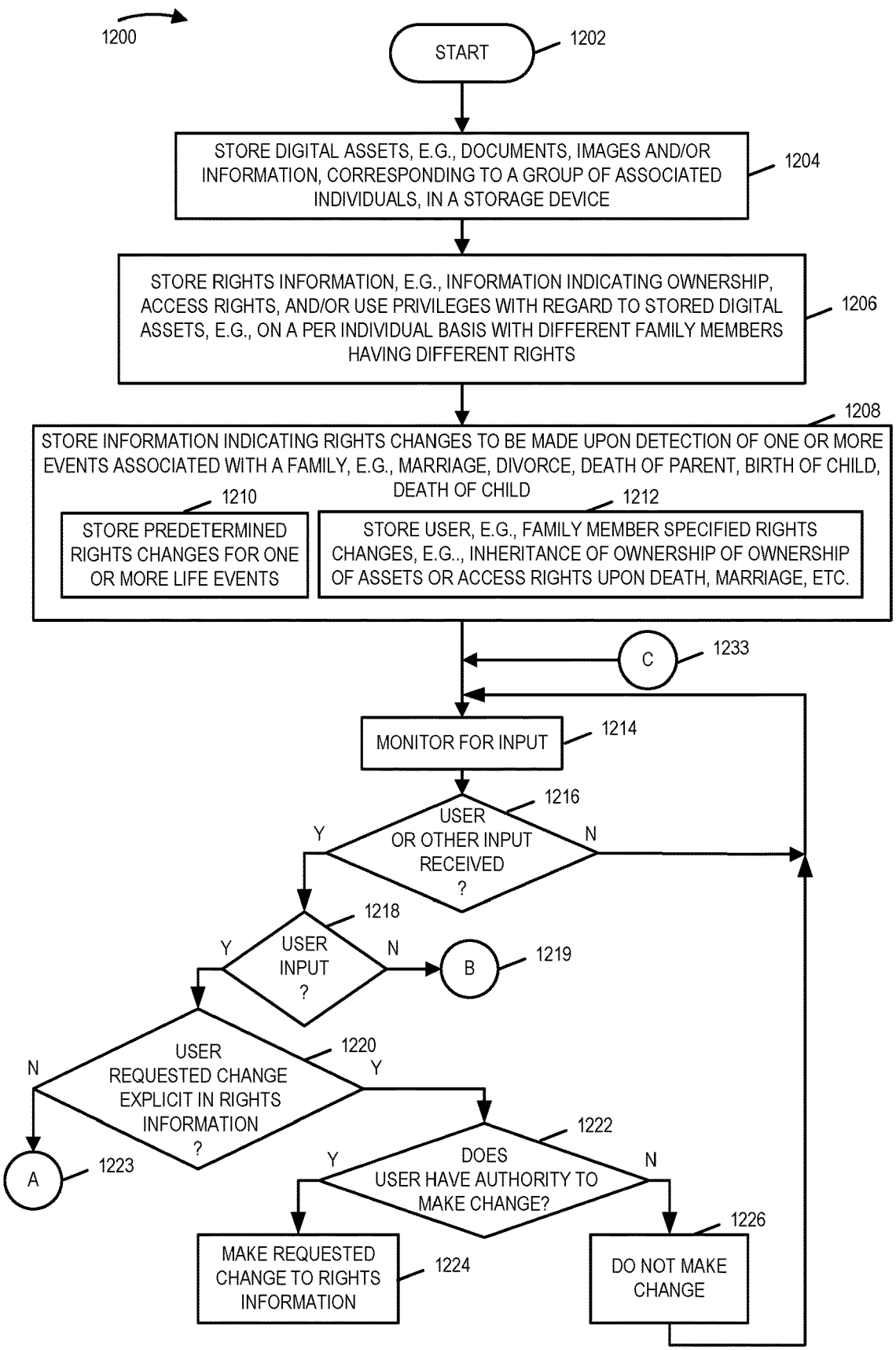
FIG. 11A is a first part of a flowchart of an exemplary method in accordance with an exemplary embodiment.
Figure 11B:
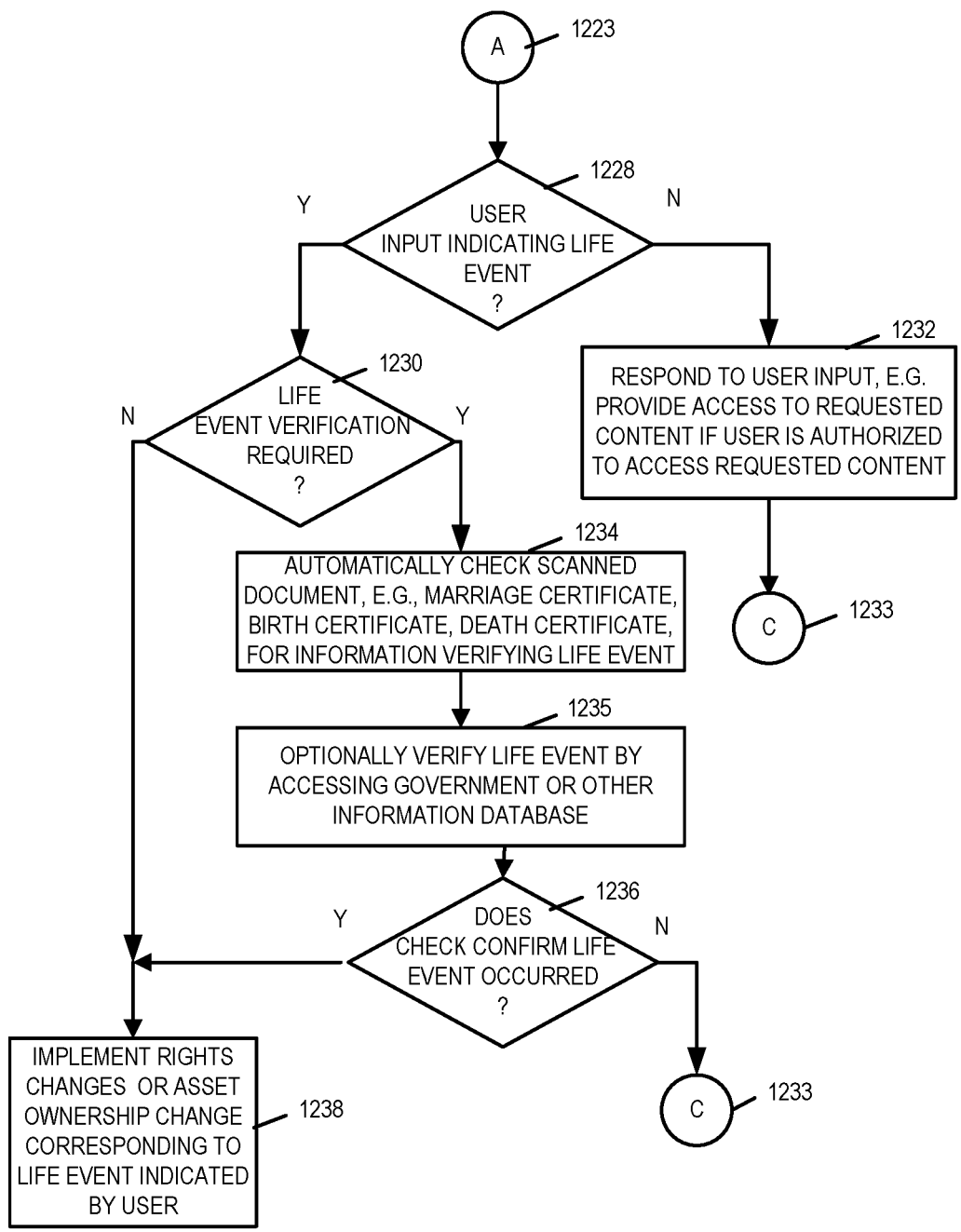
FIG. 11B is a second part of a flowchart of an exemplary method in accordance with an exemplary embodiment.
Figures 11, 11C:
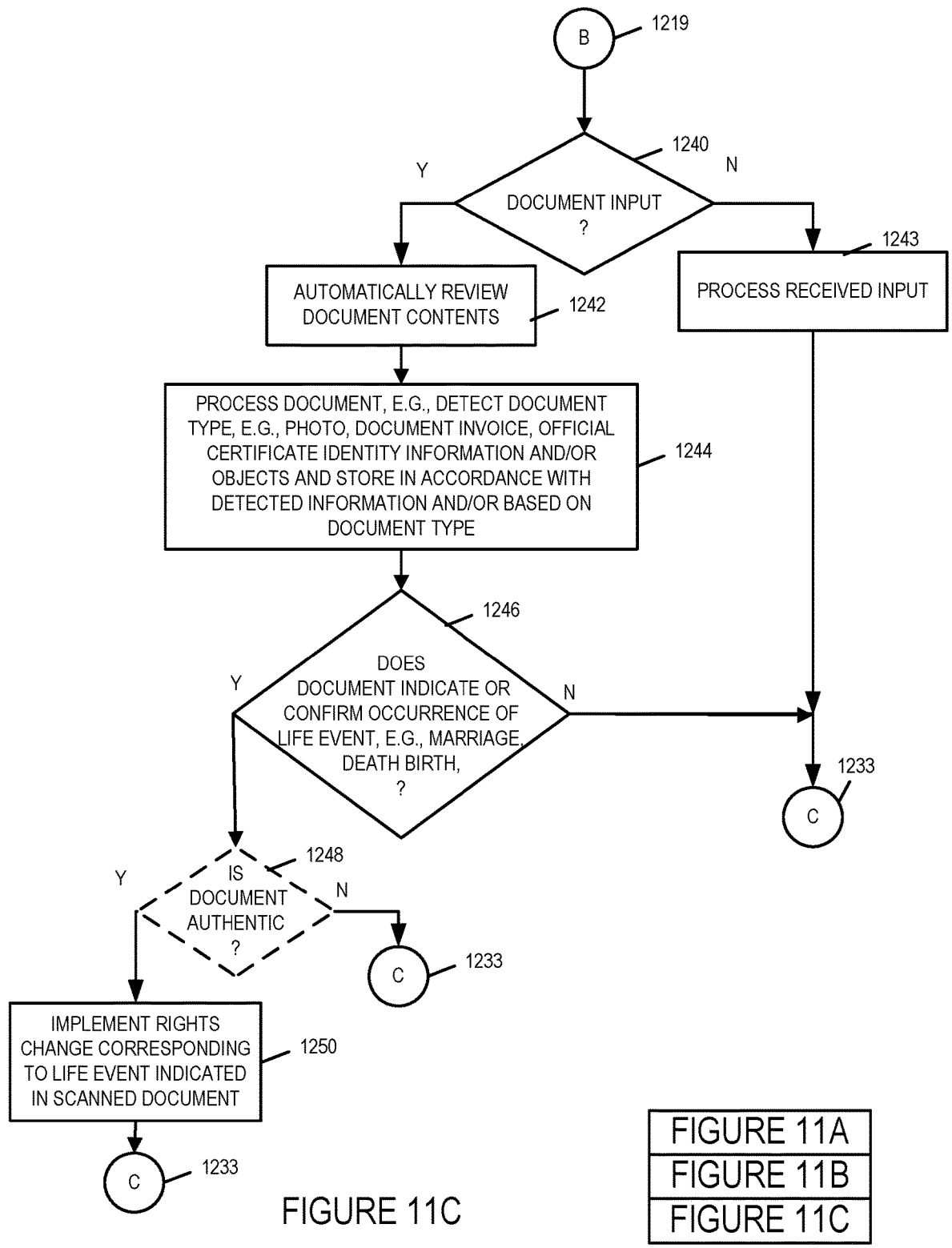
FIG. 11C is a third part of a flowchart of an exemplary method in accordance with an exemplary embodiment.
FIG. 11 shows how FIGS. 11A, 11B and 11C can be combined to form a flow chart showing steps relating to asset storage, ownership and/or access control which are used in various embodiments of the present invention to manage contents of a digital data store that may be, and sometimes is, a remote cloud based data store including family information.

FIG. 11 shows how FIGS. 11A, 11B and 11C can be combined to form a flow chart showing steps relating to asset storage, ownership and/or access control which are used in various embodiments of the present invention to manage contents of a digital data store that may be and sometimes is a remote cloud based data store including family information.

FIG. 11, comprising the combination of FIG. 11A, FIG. 11B and FIG. 11C, is a flowchart 1200 of an exemplary method in accordance with an exemplary embodiment. Operation starts in step 1200 in which an exemplary system, e.g., a system including a secure server, a plurality of household management appliances, and one or more external system provider systems, is powered on and initialized. Operation proceeds from start step 1202 to step 1204.

In step 1204 digital assets, e.g. documents, images and/or information, corresponding to a group of associated individuals, are stored in a storage device. Operation proceeds from step 1204 to step 1206.

In step 1206 rights information, e.g., information indicating ownership, access rights, and/or use privileges with regard to stored digital assets, e.g., on a per individual basis with different family members having different rights, are stored. Operation proceeds from step 1206 to step 1208.

In step 1208 information indicating rights changes to be made based upon detection of one or more events associated with a family, e.g., marriage, divorce, death of parent, birth of child, death of child, e.g., are stored. Step 1208 includes steps 1210 and 1212. In step 1210 predetermined rights changes for one or more life events are stored. In step 1212 user, e.g. family member, specified rights changes, e.g. inheritance of ownership of assets or access rights upon death, marriage, etc., are stored. Operation proceeds from step 1208 to step 1210.

In step 1214 monitoring for input is performed. Operation proceeds from step 1214 to step 1216. In step 1216, if user or other input was received, then operation proceeds from step 1216 to step 1218. However, if no user or other input was received, then operation proceeds from step 1216 to the input of step 1214 for additional monitoring.

Returning to step 1218, in step 1218 if user input was received, then operation proceeds from step 1218 to step 1220; otherwise, operation proceeds from step 1218, via connecting node B 1219 to step 1240.

Returning to step 1220, in step 1220 if the user requested change is explicit in rights information, then operation proceeds from step 1220, via connecting node A 1223 to step 1228; however, if the user requested change is not explicit in rights information, the n operation proceeds from step 1220 to step 1222.

In step 1222 a check is made as to whether or not the user has the authority to make the change. If the check of step 1220 determines that the user has the authority to make the requested change, then operation proceeds from step 1222 to step 1224, in which the requested change to the rights information is made. However, if the check of step 1220 determines that the user does not have the authority to make the requested change, then operation proceeds from step 1222 to step 1226, in which the request change is not made. Operation proceeds from step 1226 to the input of step 1214, in which additional monitoring for input is performed.

Returning to step 1228, a determination is made as to whether or not the received user input is indicating a life event. In step 1228 if the received user input is indicating a life event, then operation proceeds from step 1228 to step 1230; otherwise, operation proceeds from step 1228 to step 1232.

Returning to step 1230, ins step 1230, a determination is made as to whether or not life event verification is required. If life event verification is required, then operation proceeds from step 1230 to step 1234; otherwise operation proceeds from step 1230 to step 1238.

Returning to step 1234, in step 1234 a scanned document, e.g., a marriage certificate, birth certificate, death certificate, etc., is automatically checked for information verifying life event. Operation proceeds from step 1234 to step 1235 in which the life event is optionally verified by accessing a government or other information database. Operation proceeds from step 1235 to step 1236.

In step 1235 a determination is made as to whether or not the check confirmed that the life event occurred. If the determination is that the check confirmed the life event, then operation proceeds from step 1236 to step 1238; otherwise, operation proceeds from step 1236, via connecting node C 1233, to the input of step 1214 for additional monitoring.

Returning to step 1238, in step 1238 right changes or asset ownership changes corresponding to the life event indicated by the user are implemented.

Returning to step 1234, in step 1232 user input is responded to, e.g., access is provided to requested content if the user is authorized to access the requested content. Operation proceeds from step 1232, via connecting node C 1233, to the input of step 1214, for additional monitoring.

Returning to step 1240, in step 1240, it is determined if the other input which was received is document input. If the received input is document input, then operation proceeds from step 1240 to step 1242; otherwise operation proceeds from step 1240 to step 1243, in which received input is processed. Operation proceeds from step 1243. via connecting node C 1233 to the input of step 1214 for additional monitoring.

Returning to step 1242, in step 1242 the document contents are automatically reviewed. Operation proceeds from step 1242 to step 1243.

In step 1243 the document is processed, e.g., the document type, e.g. photo, document invoice, etc., is detected, official certificate identity information, and/or objects are detected and stored in accordance with detected information and/or based on document type. Operation proceeds from step 1244 to step 1246.

In step 1246 it is determined if the document indicates or confirms occurrence of a lifer event, e.g. marriage, divorce, death, birth, etc. If the determination is that the document does not indicate or confirm occurrence of a life event, then operation proceeds from step 1246, via connecting node C 1233, to the input of step 1214 for additional monitoring. However, if the determination is that the document does indicate or confirm occurrence of a life event, then operation proceeds from step 1246, to optional step 1248 or to step 1250. In step 1248, a determination is made as to whether or mot the document is authentic. If the determination is that the document is not authentic, then, operation proceeds from step 1248, via connecting node C 1233 to the input of step 1214 for additional monitoring. However, if the determination is that the document is authentic, then, operation proceeds from step 1248, via connecting node C 1233 to step 1250. In step 1250 rights changes corresponding to the life event indicated in the scanned document are implemented. Operation proceeds from step 1250, via connecting node C 1233, to the input of step 1214 for additional monitoring.

Figure 12:
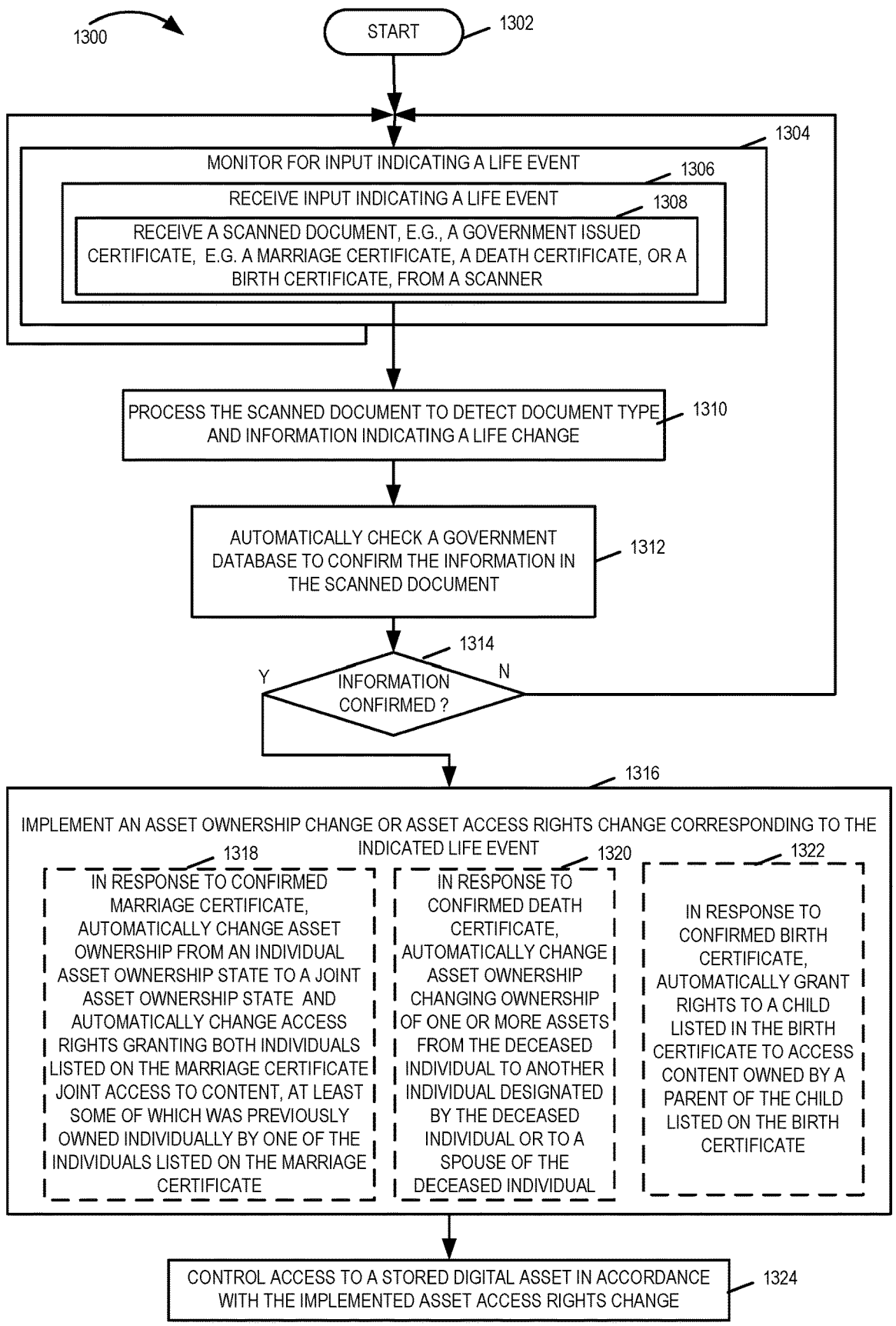
FIG. 12 is a flowchart of an exemplary method of controlling access to ownership of digital data in accordance with an exemplary embodiment.

FIG. 12 is a flowchart 1300 of an exemplary method of controlling access to ownership of digital data in accordance with an exemplary embodiment. In some embodiments, the method of flowchart 1300 is implemented by an appliance in a home, said appliance including a processor and an interface for communicating assets ownership information and./or access rights to a secure server used to store digital assets. For example, the appliance is one of appliance 108 or 111 or FIG. 1, appliance 200 of FIG. 2, appliance 300 of FIG. 3, appliance 472 of FIG. 4, appliance 500 of FIG. 5, and/or appliance 600 of FIG. 6. In some embodiments, the method of flowchart 1300 is implemented by a secure server, e.g., secure server 402 and/or secure server 900, which receives user input and document input from a home management appliance, e.g., device 472, or one or more other devices, e.g., device 470, which include or are coupled to a scanner, e.g., scanner 510.

Operation of the exemplary method starts in step 1302 in which the device is powered on and initialized. Operation proceeds from step 1302 to step 1304. In step 1304 the device monitors for input indicating a life event. Step 1304 is performed on an ongoing basis, e.g. repetitively. Step 1304 may, and sometimes does, include step 1306 in which the device receives input indicating a life event. Step 1304 may, and sometimes does, include step 1308 in which the device receives a scanned document, e.g., a government issued certificate, e.g., a marriage certificate, a death certificate, or a birth certificate, from a scanner. Operation proceeds from step 1306 to step 1310.

In step 1310 the device processes the scanned document to detect document type and information indicating a life change. Operation proceeds from step 1310 to step 1312. In step 1312 the device automatically checks a government database to confirm the information in the scanned document. Operation proceeds from step 1312 to step 1314.

In step 1314, if the information is determined to be confirmed then operation proceeds from step 1314 to step 1316; otherwise, operation proceeds from step 1314 to the input of step 1304.

In step 1316 the device implements an asset ownership change or asset access rights change corresponding to the indicated life event. In some embodiments, step 1316 includes steps 1318, 1320 and 1322. In step 1318, in response to a confirmed marriage certificate, the device automatically changes asset ownership from an individual asset ownership state to a joint asset ownership state and automatically changes access rights granting both individuals on the marriage certificate joint access to content, at least some of which was previously owned individually by one of the individuals listed on the marriage certificate. In step 1320, in response to a confirmed death certificate, the device automatically changes asset ownership changing ownership of one or more assets from the deceased individual to another individual designed by the deceased individual or to a spouse of the deceased individual. In step 1322 in response to a confirmed birth certificate, the device automatically grants rights to a child listed in the birth certificate to access content owned by a parent of the child listed on the birth certificate. In various embodiments, one of steps 1318, 1320 and 1322 is performed during an iteration of step 1316. Operation proceeds from step 1316 to step 1318.

In step 1318 the device controls access to a stored digital asset in accordance with the implemented asset rights change.

Figure 13:
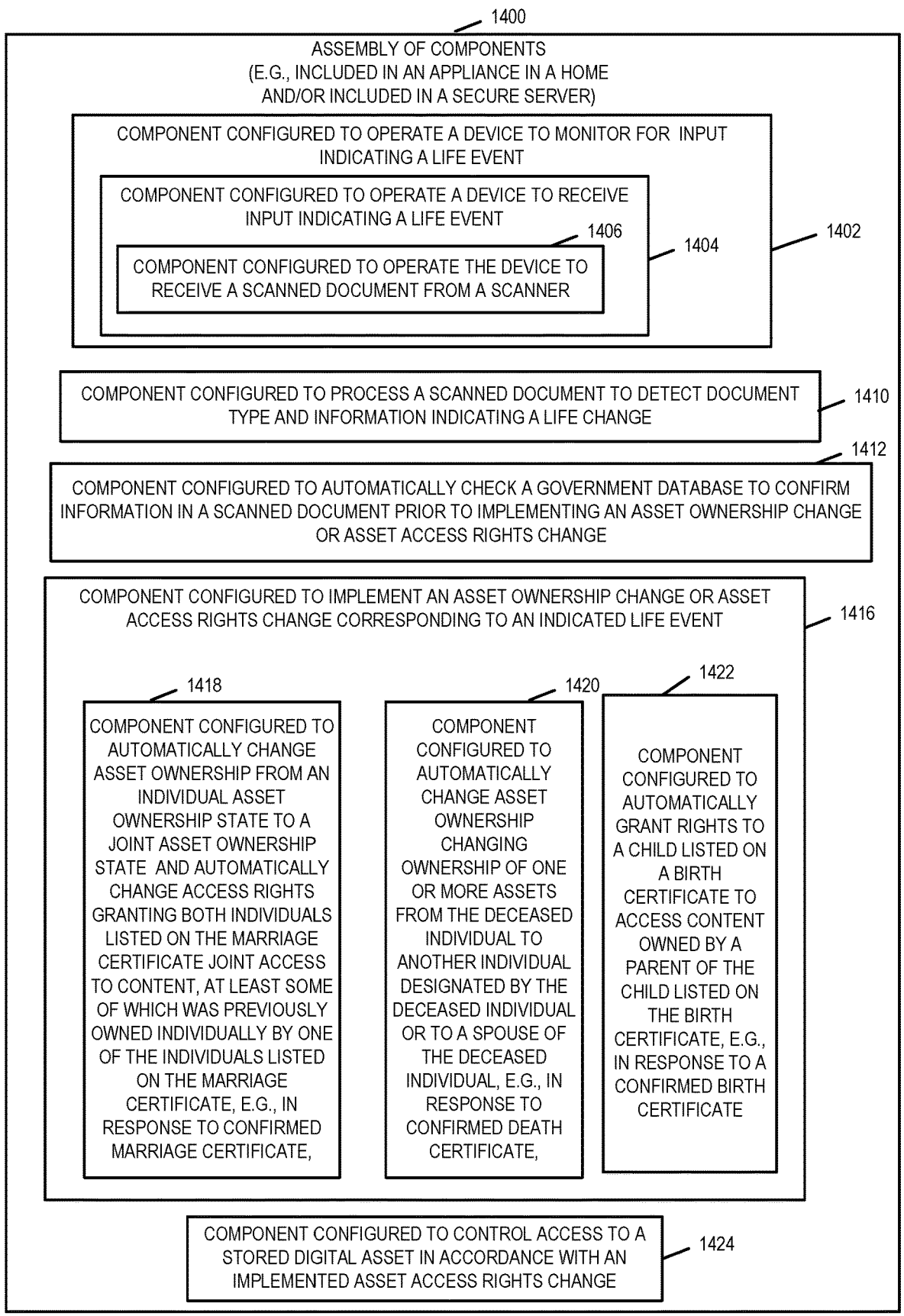
FIG. 13 is a drawing of an assembly of components, which may be included in a device, e.g., an appliance in a home or a secure server, in accordance with an exemplary embodiment.

FIG. 13 is a drawing of an assembly of components 1400, which may be included in a device, e.g., an appliance in a home and/or in a secure server, in accordance with an exemplary embodiment. In some embodiments, the device is an appliance in a home, said appliance including a processor and an interface for communicating assets ownership information and/or access rights to a secure server used to store digital assets. For example, the appliance is one of appliance 108 or 111 or FIG. 1, appliance 200 of FIG. 2, appliance 300 of FIG. 3, appliance 472 of FIG. 4, appliance 500 of FIG. 5, and/or appliance 600 of FIG. 6. In some embodiments, the device is a secure server, e.g. secure server 102, secure server 402 or secure server 900, which receives user and document input from a home management appliance or one or more other devices, e.g., device 470, which include or are coupled to a scanner, e.g. scanner 510.

The components in the assembly of components 1400 can, and in some embodiments are, implemented fully in hardware within a processor, e.g., processor 306 or 906, e.g., as individual circuits. The components in the assembly of components 1400 can, and in some embodiments are, implemented fully in hardware within the assembly of hardware components 352 or 908, e.g., as individual circuits corresponding to the different components. In other embodiments some of the components are implemented, e.g., as circuits, within processor 306 or 906 with other components being implemented, e.g., as circuits within assembly of components 352 or 908, external to and coupled to the processor 306 or 906. As should be appreciated the level of integration of components on the processor and/or with some components being external to the processor may be one of design choice. Alternatively, rather than being implemented as circuits, all or some of the components may be implemented in software and stored in the memory 302 or 912 of the device 300 or 900, with the components controlling operation of device 300 or 900 to implement the functions corresponding to the components when the components are executed by a processor e.g., processor 306 or 906. In some such embodiments, the assembly of components 1400 is included in the memory 302 or 912 as part of assembly of software components 354 or 913. In still other embodiments, various components in assembly of components 1400 are implemented as a combination of hardware and software, e.g., with another circuit external to the processor providing input to the processor which then under software control operates to perform a portion of a component's function.

When implemented in software the components include code, which when executed by a processor, e.g., processor 306 or 906, configure the processor to implement the function corresponding to the component. In embodiments where the assembly of components 1400 is stored in the memory 302 or 912, the memory 302 or 912 is a computer program product comprising a computer readable medium comprising code, e.g., individual code for each component, for causing at least one computer, e.g., processor 306 or 906, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 13 control and/or configure the device 300 or 900 or elements therein such as the processor 306 or 906, to perform the functions of corresponding steps illustrated and/or described in the method of one or more of the flowcharts, signaling diagrams and/or described with respect to any of the Figures. Thus the assembly of components 1400 includes various components that perform functions of corresponding one or more described and/or illustrated steps of an exemplary method, e.g., the method of flowchart 1300 of FIG. 12.

Assembly of components 1400 includes a component 1402 configured to operate a device to monitor for input indicating a life event. Component 1402 includes a component 1404 configured to operate the device to receive input indicating a life event. Component 1404 includes a component 1406 configured to operate the device to receive a scanned document, e.g., a government issued certificate such as a marriage certificate, death certificate or birth certificate, from a scanner. Assembly of components 1400 further includes a a component 1410 configured to process a scanned document to detect document type and information indicating a life change, and a component 1412 configured to automatically check a government database to confirm information in a scanned document prior to implementing an asset ownership change or asset access rights change. Assembly of components 1400 further includes and a component 1314 configured to implement an asset ownership change or asset access rights change corresponding to an indicated life event. Component 1314 includes a component 1318 configured to automatically change asset ownership from an individual asset ownership state to a joint asset ownership state and to automatically change access rights granting both individuals listed on the marriage certificate joint access to content, at least some of which was previously owned individually by one of the individuals listed on the marriage certificate, e.g. in response to a confirmed marriage certificate, a component 1420 configured to automatically change asset ownership changing ownership of one or more assets from the deceased individual to another individual designated by the deceased individual or to the spouse of the deceased individual, e.g. in response to a confirmed death certificate, and a component 1422 configured to automatically grant right to a child listed on a birth certificate to access content owned by a parent of the child listed on the birth certificate, e.g., in response to a confirmed birth certificate. Assembly of components 1400 further includes a component 1424 configured to control access to a stored digital asset in accordance with an implemented asset access rights change.

Numbered List of Exemplary Method Embodiments

Method Embodiment 1 A method controlling access to or ownership of digital data, the method comprising: receiving (1306) input indicating a life event; and implementing (1316) an asset ownership change or asset access rights change corresponding to the indicated life event.

Method Embodiment 1A The method of Method Embodiment 1, wherein implementing (1316) an asset ownership change or asset access rights change corresponding to the indicated life event includes updating asset ownership information stored in memory.

Method Embodiment 2. The method of Method Embodiment 1, further comprising: controlling (1324) access to a stored digital asset in accordance with the implemented asset access rights change.

Method Embodiment 3 The method of Method Embodiment 1, wherein receiving (1306) input includes receiving a scanned document from a scanner, the method further comprising: processing (1310) the scanned document to detect document type and information indicating a life change.

Method Embodiment 4 The method of Method Embodiment 3, wherein the document is a government issued certificate.

Method Embodiment 5 The method of Method Embodiment 4, further comprising: automatically (1312) checking a government database to confirm the information in the scanned document prior to implementing the asset ownership change or asset access rights change.

Method Embodiment 6 The method of Method Embodiment 5, wherein said scanned document is a marriage certificate and wherein said asset ownership change or asset access rights change includes an automatic change(1318) in asset ownership from an individual ownership state to a joint asset ownership state and a change in access rights granting both individuals listed on the marriage certificate joint access to content at least some of which was previously owned individually by one of the individuals listed on the marriage certificate.

Method Embodiment 7 The method of Method Embodiment 6, wherein said scanned document is a death certificate and wherein said asset ownership change or asset access rights change includes an automatic change (1320) in asset ownership changing ownership of one or more assets from the deceased individual to another individual designated by the deceased individual or to a spouse of the deceased individual.

Method Embodiment 8 The method of Method Embodiment 5, wherein said scanned document is a birth certificate and wherein said asset ownership change or asset access rights change includes: an automatic granting (1322) of rights to a child listed on the birth certificate to access content owned by a parent of the child listed on the birth certificate.

Method Embodiment 9 The method of Method Embodiment 8 wherein said method is implemented by an appliance (108 or 111 or 200 or 300 or 500 or 600 or 472 or 900) in a home, said appliance (108 or 111 or 200 or 300 or 500 or 600 or 472 or 900) including a processor (306) and an interface (304) for communicating assets ownership information and/or access rights to a secure server (102 or 402 or 900) used to store digital assets.

Method Embodiment 10 The method of Method Embodiment 8 wherein said method is implemented by a secure server (102 or 402 or 900) which receives user and document input from a home management appliance (472) or one or more another device (470) which include or are coupled to a scanner (510).

Method Embodiment 11 The method of Method Embodiment 10, wherein the secure server (102 or 402 or 900) includes household information in a portion (438 of 436) of memory (912) used as a digital vault to store digital assets owned by one or more members of a household.

Some embodiments are directed to a system including one or more devices. The system can include a combination of network and/or customer premise devices with the processor responsible for performing various operations being located at a different location or in a different device than the memory, e.g., storage device used to store the assets for which ownership information and access rights information are stored in the same or different memory. In some embodiments the system is implemented as a network device and in other embodiments the system is implemented as a customer premise device while in various embodiments the system includes network and customer premise devices which work together to implemented the method of the invention.

Thus in some cases exemplary numbered system 1 is directed is a customer premises device in which case the memory corresponds to memory 302 and the processor corresponds to processor 306. In other embodiments where the system to which apparatus embodiment 1 is directed is a network device such as sever 900 shown in FIG. 9, the memory is memory 912 and the processor is processor 906. Whether the apparatus corresponds to the customer premise device (300) or the network sever (900), assets, corresponding ownership information and asset access rights information can be and sometimes is stored in one or more devices and updated in accordance with the invention when information or data is received indicating a life event which results in a change in assets ownership or access rights.

In some cases the system is implemented as a combination of network and customer premise device components in which case the processor maybe located in the network server (900) or a customer premise device (300) depending on the embodiment with the memory (302 or 912) storing the assets, ownership and access rights information being located in the network device (900) or customer premise device (300). Accordingly a wide variety of system embodiments are possible with in some cases the memory used to store assets, asset ownership information and access rights information being distributed between different devices with the network device, e.g., server 900, storing in its memory (906) some information, e.g., ownership and access rights information. while the customer premises device (300) stores the actual asset, e.g., data file or image, in its memory (302).

For example, when the system is implemented as a home appliance, e.g., a customer premises device such as home appliance 108, 200 or 300 the memory of the home appliance may and sometimes does include, as part of the stored data 340, assets, e.g., stored files of documents, images or data, and/or asset ownership information indicating which individual member or members of a family own a particular stored asset and/or asset access rights information indicating who can access individual stored assets, e.g., information indicating which files, data and/or images can be accessed by which particular family member or other identified individual. The ownership and/or access rights information is updated by the processor (306 or 906) responsible for implementing one or more steps of the method based information indicating changes in life events as discussed elsewhere in the application.

When the first numbered apparatus embodiment is directed to a network device, e.g., a server such as the secure server 900 shown in FIG. 9, the customer information 434 and secure vault 438 or 442 corresponding to a household, e.g., household 1 or household n, includes assets, e.g., stored files of documents, images or data, along with asset ownership information indicating which individual member or members of a family own a particular stored asset and/or asset access rights information indicating who can access individual stored assets, e.g., information indicating which files, data and/or images can be accessed by which particular family member or other identified individual. The ownership and/or access rights information is updated by the processor 906 based information indicating changes in life events as discussed elsewhere in the application.

In other embodiments the assets are stored in the home appliance while the secure server controls and stores access rights information and/or ownership information in its memory 912 which is used to control access to the assets stored in the memory of the home appliance 300.

Numbered List of System Embodiments

Numbered System embodiment 1: A system (300, 900 or combination of 300 and 900) for controlling access to or ownership of digital data, the system comprising: a memory (302 or 912) including asset ownership information and/or asset access rights information (e.g. where asset ownership information may be and sometimes does indicate who is the owner of an asset such as a digital file, stored information or stored image and where assets access rights information includes information identifying one or more individuals, e.g., family members, and what rights the identified family member or members has to access individual assets, e.g., digital fields, stored information or stored images); and a processor (306 or 906) configured to: receive (1306) input indicating a life event; and implement (1316) an asset ownership change or asset access rights change corresponding to the indicated life event (e.g., by updating, modifying or otherwise charging asset ownership information stored in the memory for one or more assets and/or changing access rights information in the memory corresponding to one or more family members and one or more stored assets).

Numbered System embodiment 1A The system of system embodiment 1, wherein implementing (1316) an asset ownership change or asset access rights change corresponding to the indicated life event includes updating assets ownership information stored in memory (302 or 912).

Numbered System embodiment 2. The system of system embodiment 1, wherein the processor (306 or 906) to control (1324) access to a stored digital asset in accordance with the implemented asset access rights change.

Numbered System embodiment 3. The system of system embodiment 1, wherein operating the processor (306 or 906) to receive (1306) input includes receiving a scanned document from a scanner, the processor being further configured to: process (1310) the scanned document to detect document type and information indicating a life change.

Numbered System embodiment 4. The system of system embodiment 3, wherein the document is a government issued certificate.

Numbered System embodiment 5. The system of system embodiment 4, wherein the processor (306 or 906) is further configured to: automatically (1312) check a government database to confirm the information in the scanned document prior to implementing the asset ownership change or asset access rights change.

Numbered System embodiment 6. The system of system embodiment 5, wherein said scanned document is a marriage certificate and wherein said asset ownership change or asset access rights change includes an automatic change (1318) in stored asset ownership from an individual ownership state to a joint asset ownership state and a change in stored access rights information indicating that both individuals listed on the marriage certificate are entitled to joint access to content (e.g., a file, image or data) at least some of which was previously owned individually by one of the individuals listed on the marriage certificate.

Numbered System embodiment 7. The system of system embodiment 6, wherein said scanned document is a death certificate and wherein said asset ownership change or asset access rights change includes an automatic change (1320) in asset ownership which is a change in ownership of one or more assets from the deceased individual to another individual designated by the deceased individual or to a spouse of the deceased individual, said another individual being indicated in the stored ownership information in memory as the owner following said automatic change in asset ownership.

Numbered System embodiment 8. The system of system embodiment 5, wherein said scanned document is a birth certificate and wherein said asset ownership change or asset access rights change includes: an automatic granting (1322) of rights to a child listed on the birth certificate to access content owned by a parent of the child listed on the birth certificate, the stored access rights information indicating the child listed on the birth certificate is entitled to access at least some stored content (e.g., a file, image or data) owned by the parent which the child was not entitled to access prior to the automatic granting of access rights to the child listed on the birth certificate.

Numbered System embodiment 9. The system of system embodiment 8 wherein said system is an appliance (108 or 111 or 200 or 300 or 500 or 600 or 472 or 900) in a home, said appliance (108 or 111 or 200 or 300 or 500 or 600 or 472 or 900.

Numbered System embodiment 10. The system of system embodiment 8, wherein the system is a secure server (102 or 402 or 900) which receives user and document input from a home management appliance (472) or one or more another device (470) which include or are coupled to a scanner (510) and which is located at a customer premise.

Numbered System embodiment 11. The system of system embodiment 10, wherein the secure server (102 or 402 or 900) includes household information in a portion (438 of 436) of memory (912) used as a digital vault to store digital assets owned by one or more members of a household.

While document scanning is normally done in a home using a scanner included in or attached to a device in the home, the access control and ownership decisions can be made by the processor of the home device or by the processor of the secure server depending on the particular embodiment.

Thus depending on the particular embodiment one or more of the steps shown in FIG. 11 can be implemented by the home management appliance 472 or another home device and/or by components in the secure sever 402 which controls the secure server to operate in accordance with the invention.

In view of the above, it should be appreciated that the appliance of the present invention offers numerous advantages over personal computer based systems and/or dedicated health care or photo scanning systems.

The methods of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are also directed to machine, e.g., computer, readable medium, e.g., ROM, RAM, CDs, hard discs, etc., which include machine readable instructions for controlling a machine, e.g., processor or computer system, to implement one or more steps of a method.

It is understood that the specific order or hierarchy of steps in the processes disclosed is an example of exemplary approaches. Based upon design preferences, it is understood that the specific order or hierarchy of steps in the processes may be rearranged to some extent while remaining within the scope of the present disclosure.

In various embodiments nodes described herein are implemented using one or more modules to perform the steps corresponding to one or more methods. Thus, in some embodiments various features are implemented using modules. Such modules may be implemented using software, hardware or a combination of software and hardware. Many of the above described methods or method steps can be implemented using machine executable instructions, such as software, included in a non-transitory machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine, e.g., computer, readable medium including machine, e.g., computer, executable instructions for causing a machine, e.g., computer, processor and/or associated hardware, to perform one or more of the steps of the above-described method(s).

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of the method or methods described herein. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope of the invention.

What is claimed is:

1. A method controlling access to stored digital data the method comprising:
   storing, in a storage device, access rights information corresponding to stored digital data;
   receiving, at a processor, input indicating a life event, said life event being an event indicated in a document, said document being a marriage certificate providing legal notice of the life event, said life event being a marriage event;
   operating the processor to automatically implement a change in asset ownership from an individual asset ownership state to a joint asset ownership state and a change in access rights granting both a first individual and a second individual listed on the marriage certificate joint access to stored digital content, included in said stored digital data, at least some of which was previously owned individually by one of the first and second individuals listed on the marriage certificate, said change in access rights including updating stored access rights information; and
   operating the processor to control access to the stored digital data in accordance with the updated stored access rights information.

2. The method of claim 1, further comprising:
   operating the processor to check a government database to confirm the information in the marriage certificate prior to automatically implementing the change in access rights.

3. The method of claim 1, wherein receiving, at the processor, input indicating a life event includes receiving a scanned document from a scanner; and wherein the method further includes:
   processing the scanned document to detect information indicating said life event.

4. The method of claim 3, wherein the document is a government issued certificate.

5. The method of claim 4, further comprising:
   automatically checking a government database to confirm the information in the scanned document prior to automatically implementing the change in access rights.

6. The method of claim 1, further comprising:
   receiving, at the processor, a scanned death certificate listing a deceased individual; and automatically implementing an asset access rights change including an automatic change in access rights from the deceased individual to another individual designated by the deceased individual or to a spouse of the deceased individual.

7. The method of claim 1, further comprising:
receiving, at the processor, a scanned birth certificate listing a child; and
automatically granting access rights to the child listed on the birth certificate allowing the child access to stored digital data owned by a parent of the child listed on the birth certificate.

8. The method of claim 5, wherein said scanner is an appliance in a home.

9. The method of claim 1, wherein said method is implemented by a secure server which receives user and document input from a device located in a home, said device including or being coupled to a scanner.

10. The method of claim 9, wherein the secure server includes household information in a portion of memory used as a digital vault to store digital assets, including said stored digital data, owned by one or more members of a household.

11. A system for controlling access to stored digital data, the system comprising:
a storage device storing access rights information corresponding to stored digital data; and
a processor configured to:
receive input indicating a life event, said life event being an event indicated in a document, said document being a marriage certificate providing legal notice of the life event, said life event being a marriage event;
automatically implement a change in asset ownership from an individual asset ownership state to a joint asset ownership state and a change in access rights granting both a first individual and a second individual listed on the marriage certificate joint access to stored digital content, included in said stored digital data, at least some of which was previously owned individually by one of the first and second individuals listed on the marriage certificate, said change in access rights including updating stored access rights information; and
control access to the stored digital data in accordance with the updated stored access rights information.

12. The system of claim 11, wherein said marriage certificate is a scanned government issued marriage certificate; and
wherein the processor is further configured to check a government database to confirm the information in the marriage certificate prior to automatically implementing the change in access rights.

13. The system of claim 11, wherein the processor is configured to:
receive a scanned document from a scanner as part of receiving input indicating the life event; and
process the scanned document to detect a document type and information indicating said life event.

14. The system of claim 13, wherein the document is a government issued certificate.

15. The system of claim 14, wherein the processor is further configured to:
automatically check a government database to confirm the information in the scanned document prior to automatically implementing the change in access rights.

16. The system of claim 11, wherein the processor is further configured to:
receive a death certificate listing a deceased individual; and
make an automatic change in access rights from the deceased individual to another individual designated by the deceased individual or to a spouse of the deceased individual.

17. The system of claim 11,
wherein said processor is configured to:
receive a birth certificate listing a child; and
automatically grant access rights to the child listed on the birth certificate allowing the child access to stored digital data owned by a parent of the child listed on the birth certificate.

18. The system of claim 15, wherein said system includes said scanner, said scanner being located in a home.

19. The system of claim 11, wherein processor and storage device are part of a secure server which receives user and document input from a device located in a home, said device located in the home including a scanner or being coupled to a scanner.

* * * * *